US012552370B2

(12) United States Patent
Kato

(10) Patent No.: US 12,552,370 B2
(45) Date of Patent: Feb. 17, 2026

(54) MERGE ASSIST APPARATUS

(71) Applicant: SUBARU CORPORATION, Tokyo (JP)

(72) Inventor: Hideaki Kato, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 142 days.

(21) Appl. No.: 18/407,226

(22) Filed: Jan. 8, 2024

(65) Prior Publication Data

US 2024/0239333 A1 Jul. 18, 2024

(30) Foreign Application Priority Data

Jan. 18, 2023 (JP) .................. 2023-005929

(51) Int. Cl.
B60W 30/09 (2012.01)
G08G 1/16 (2006.01)

(52) U.S. Cl.
CPC ............ B60W 30/09 (2013.01); G08G 1/161 (2013.01); G08G 1/167 (2013.01); B60W 2556/65 (2020.02)

(58) Field of Classification Search
CPC .......... B60W 30/09; B60W 30/18154; B60W 50/00; B60W 50/14; B60W 2556/65; G08G 1/167
See application file for complete search history.

(56) References Cited

U.S. PATENT DOCUMENTS

| | | | | |
|---|---|---|---|---|
| 10,089,876 | B1* | 10/2018 | Ramasamy | G05D 1/028 |
| 11,242,051 | B1* | 2/2022 | Konrardy | G08G 1/096725 |
| 2017/0369055 | A1* | 12/2017 | Saigusa | G08G 1/096775 |
| 2019/0272744 | A1* | 9/2019 | Suzuki | G08G 1/167 |
| 2020/0180636 | A1* | 6/2020 | Oh | B60W 30/09 |
| 2020/0286386 | A1* | 9/2020 | Zhou | G08G 1/096775 |
| 2021/0261133 | A1* | 8/2021 | Sakayori | B60W 30/18163 |
| 2022/0009493 | A1* | 1/2022 | Mizoguchi | G06V 20/58 |
| 2023/0060940 | A1* | 3/2023 | Avedisov | G08G 1/165 |

FOREIGN PATENT DOCUMENTS

JP 2007-316772 A 12/2007

* cited by examiner

Primary Examiner — Anshul Sood
(74) Attorney, Agent, or Firm — Rimon P.C.

(57) ABSTRACT

A merge assist apparatus to be applied to a vehicle includes a receiver, a processor, and a transmitter. The receiver is configured to receive a first request signal including merging point data regarding a position of a merging point at which a first vehicle plans to merge. The processor is configured to determine whether the vehicle is able to decelerate to a speed less than or equal to a predetermined speed before the vehicle reaches the merging point, based on the merging point data included in the first request signal. The transmitter is configured to transmit, to a second vehicle traveling behind the vehicle, a second request signal including the merging point data included in the first request signal when the processor determines that the vehicle is unable to decelerate to the speed less than or equal to the predetermined speed.

5 Claims, 16 Drawing Sheets

MERGE ASSIST APPARATUS

CROSS-REFERENCE TO RELATED APPLICATIONS

The present application claims priority from Japanese Patent Application No. 2023-005929 filed on Jan. 18, 2023, the entire contents of which are hereby incorporated by reference.

BACKGROUND

The disclosure relates to a merge assist apparatus that assists merging of a vehicle.

Vehicles often merge into a traveling path on which many vehicles are traveling. For example, Japanese Unexamined Patent Application Publication No. 2007-316772 discloses an apparatus that assists in such merging of vehicles.

SUMMARY

An aspect of the disclosure provides a merge assist apparatus to be applied to a vehicle. The merge assist apparatus includes a receiver, a processor, and a transmitter. The receiver is configured to receive a first request signal including merging point data regarding a position of a merging point at which a first vehicle plans to merge. The processor is configured to determine whether the vehicle is able to decelerate to a speed less than or equal to a predetermined speed before the vehicle reaches the merging point, based on the merging point data included in the first request signal. The transmitter is configured to transmit, to a second vehicle traveling behind the vehicle, a second request signal including the merging point data included in the first request signal when the processor determines that the vehicle is unable to decelerate to the speed less than or equal to the predetermined speed.

An aspect of the disclosure provides a merge assist apparatus to be applied to a vehicle. The merge assist apparatus comprising one or more processors. The one or more processors are configured to: receive a first request signal comprising merging point data regarding a position of a merging point at which a first vehicle plans to merge; determine whether the vehicle is able to decelerate to a speed less than or equal to a predetermined speed before the vehicle reaches the merging point, based on the merging point data comprised in the first request signal; and transmit, to a second vehicle traveling behind the vehicle, a second request signal comprising the merging point data comprised in the first request signal when the processor determines that the vehicle is unable to decelerate to the speed less than or equal to the predetermined speed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

It is desirable that merging of a vehicle be appropriately assisted when the vehicle merges into a traveling path on which many vehicles are traveling, and more appropriate assistance is expected.

It is desirable to provide a merge assist apparatus that makes it possible to more appropriately assist in merging of a vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function

EXAMPLE EMBODIMENT

Example Configuration

Figure 1:
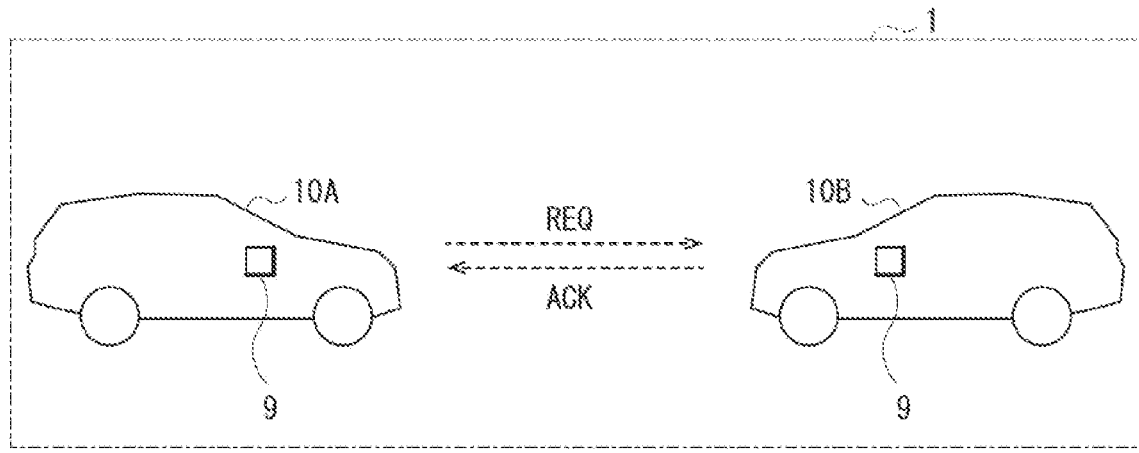
FIG. 1 is a configuration diagram illustrating an example configuration of a merge assist system according to one example embodiment of the disclosure.

FIG. 1 illustrates an example configuration of a merge assist system 1 including a merge assist apparatus 9 according to an example embodiment. The merge assist system 1 may include multiple vehicles 10. Note that FIG. 1 illustrates two vehicles 10 (a vehicle 10A and a vehicle 10B). Each vehicle 10 may be, for example, an automobile. Each vehicle 10 may include the merge assist apparatus 9.

In the merge assist system 1, for example, when merging into a traveling path on which multiple vehicles are traveling, the vehicle 10A may transmit a request signal REQ (a request signal REQ1) through vehicle-to-vehicle communication. The request signal REQ1 includes, for example, data regarding a position of a point (a merging point P) at which the vehicle 10A plans to merge. The data regarding the merging point P may also be referred to as merging point data. The vehicle 10B (for example, a vehicle 10B1) traveling on the traveling path to which the vehicle 10A intends to merge checks whether the vehicle 10B1 is able to sufficiently decelerate before the vehicle 10B1 reaches the merging point P, based on the request signal REQ1. If the vehicle 10B1 is able to sufficiently decelerate before the vehicle 10B1 reaches the merging point P, the vehicle 10B1 may transmit an acknowledgment signal ACK to the vehicle 10A and decelerate before the vehicle 10B1 reaches the merging point P to make it possible for the vehicle 10A to merge. If the vehicle 10B1 is unable to sufficiently decelerate before the vehicle 10B1 reaches the merging point P, the vehicle 10B1 transmits a request signal REQ (a request signal REQ2) including the data regarding the position of the merging point P to another vehicle 10B, such as a vehicle 10B2, traveling behind the vehicle 10B1. The vehicle 10B2 may check whether the vehicle 10B2 is able to sufficiently decelerate before the vehicle 10B2 reaches the merging point P, based on the request signal REQ2. If the vehicle 10B2 is able to sufficiently decelerate before the vehicle 10B2 reaches the merging point P, the vehicle 10B2 may transmit an acknowledgment signal ACK to the vehicle 10A and decelerate before the vehicle 10B2 reaches the merging point P to make it possible for the vehicle 10A to merge. In the merge assist system 1, as described above, the request signal REQ2 may be transmitted to the vehicle 10B located so far that the vehicle 10A is unable to directly transmit the request signal REQ1 in addition to the vehicle 10B1 to which the vehicle 10A is able to directly transmit the request signal REQ1. This makes it possible for the merge assist system 1 to appropriately assist in merging of the vehicle 10A.

Figure 2:
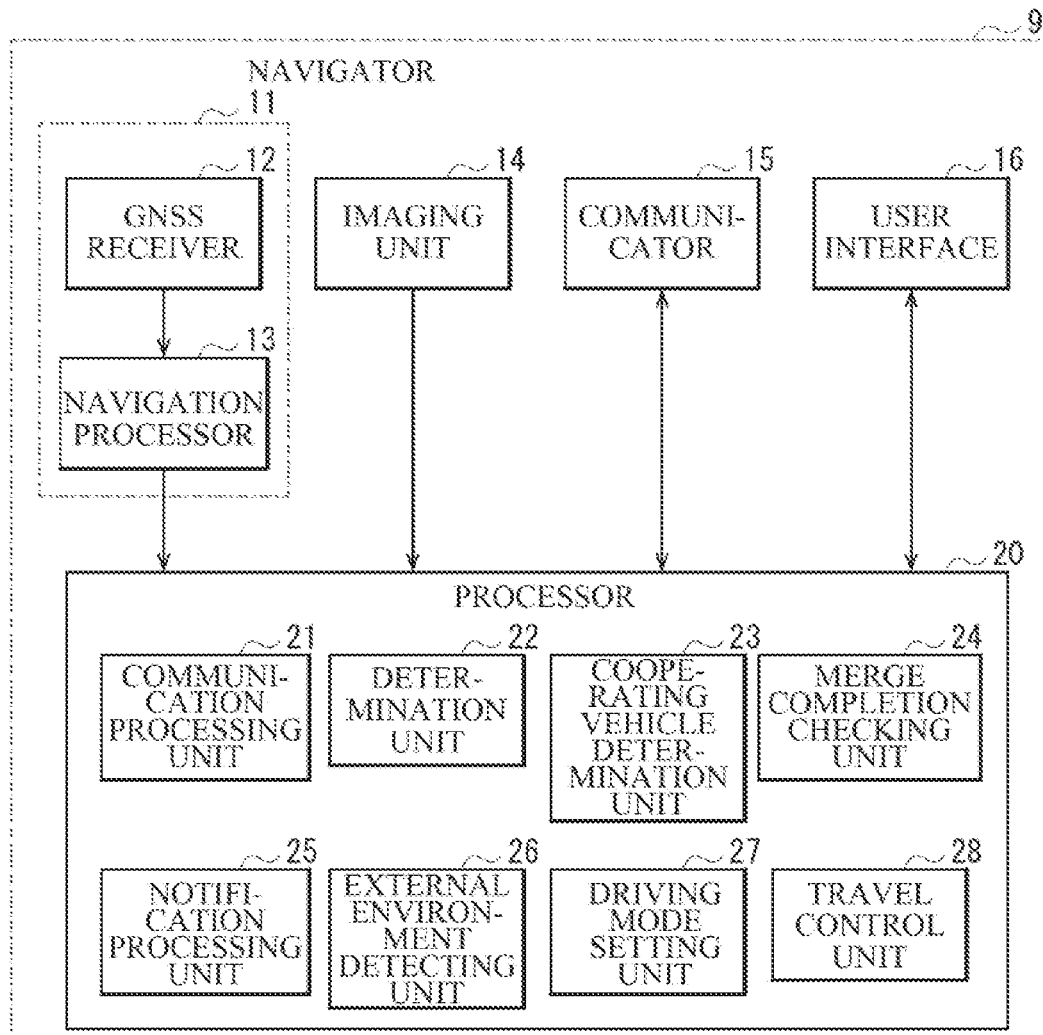
FIG. 2 is a block diagram illustrating an example configuration of a merge assist apparatus illustrated in FIG. 1.

FIG. 2 illustrates an example configuration of the merge assist apparatus 9. The merge assist apparatus 9 may include a navigator 11, an imaging unit 14, a communicator 15, a user interface 16, and a processor 20.

The navigator 11 may be configured to determine a route to a destination (a planned travel route) on which the vehicle 10 is to travel. The navigator 11 may be configured to provide a driver who drives the vehicle 10 with information to thereby guide the vehicle 10 along the determined route. The navigator 11 may include a global navigation satellite system (GNSS) receiver 12 and a navigation processor 13.

The GNSS receiver 12 may be configured to acquire a position of the vehicle 10 on the ground using a GNSS such as a global positioning system (GPS). The navigation processor 13 may determine the planned travel route of the vehicle 10 using a map database including data regarding a road map. The navigation processor 13 may include, for example, a storage that stores the map database, and determine the planned travel route using the map database stored in the storage. Alternatively, the navigation processor 13 may include, for example, a communicator that communicates with a network server storing the map database, and determine the planned travel route based on the data acquired from the network server. The navigator 11 may determine the planned travel route to the destination based on, for example, information regarding the destination entered by the driver by operating the user interface 16. The navigator 11 may provide the driver with the information regarding the determined route using the user interface 16. Furthermore, the navigator 11 may supply, to the processor 20, the data regarding the position of the merging point P ahead of the vehicle 10, the position of the vehicle 10, and a lane on which the vehicle 10 is traveling, based on the map database.

The imaging unit 14 may be configured to generate captured images by performing imaging, i.e., capturing images, of a front region of the vehicle 10. The imaging unit 14 may include, for example, a monocular camera or a stereo camera. The imaging unit 14 may supply the captured images to the processor 20.

The communicator 15 may be configured to perform the vehicle-to-vehicle communication with vehicles around the vehicle 10. For example, the communicator 15 may communicate with vehicles around the vehicle 10 using, for example, wireless communication such as vehicle-to-everything (V2X) communication.

The user interface 16 may include, for example, a display panel, a touch panel, and various buttons. The user interface 16 may be configured to receive operation of an occupant of the vehicle 10 and notify the occupant of information.

The processor 20 may be configured to perform a process of assisting in merging of the vehicle 10. The processor 20 may include, for example, one or more processors and one or more memories. The processor 20 may execute a program to thereby perform a merge assist process of assisting in merging of the vehicle 10. The processor 20 may include a communication processing unit 21, a determination unit 22, a cooperating vehicle determination unit 23, a merge completion checking unit 24, a notification processing unit 25, an external environment detecting unit 26, a driving mode setting unit 27, and a travel control unit 28.

The communication processing unit 21 may be configured to perform a transmission process of a signal to be transmitted by the communicator 15 and a receiving process of a signal received by the communicator 15.

The determination unit 22 may be configured to determine whether to respond to the request signal REQ. If it is determined that the vehicle 10 is to respond to the request signal REQ, the determination unit 22 may be configured to determine whether the vehicle 10 is able to sufficiently decelerate before the vehicle 10 reaches the merging point P, based on the data regarding the position of the merging point P included in the request signal REQ. For example, the determination unit 22 of the vehicle 10B may determine whether to respond to the request signal REQ by determining, based on the data supplied from the navigator 11, whether the position of the vehicle 10B is before the merging point P and whether the lane on which the vehicle 10B is traveling is the lane to which the vehicle 10A is to merge. If the vehicle 10B is to respond to the request signal REQ, the determination unit 22 of the vehicle 10B may calculate a distance between the position of the vehicle 10B and the merging point P, based on the data regarding the position of the merging point P included in the request signal REQ. The determination unit 22 may determine whether the vehicle 10B is able to decelerate to a speed less than or equal to a predetermined speed before the vehicle 10B reaches the merging point P, based on the speed of the vehicle 10B and the distance to the merging point P.

The cooperating vehicle determination unit 23 may be configured to determine a cooperating vehicle that will cooperate in merging. For example, if the communicator 15 of the vehicle 10A has received, for example, one acknowledgment signal ACK transmitted from one vehicle 10B, the cooperating vehicle determination unit 23 of the vehicle 10A may determine that the vehicle 10B is a cooperating vehicle in merging. Alternatively, if the communicator 15 of the vehicle 10A has received, for example, multiple acknowledgment signals ACK transmitted from multiple vehicles 10B, the cooperating vehicle determination unit 23 of the vehicle 10A may select one of the vehicles 10B as the cooperating vehicle in merging.

The merge completion checking unit 24 may be configured to check completion of the merge assist process when merging of the vehicle 10A is completed. For example, the merge completion checking unit 24 of the vehicle 10A may check the completion of the merge assist process by checking that the vehicle 10A has merged, based on, for example, the data supplied from the navigator 11 and the captured images supplied from the imaging unit 14. The merge completion checking unit 24 of the vehicle 10B may check the completion of the merge assist process by checking that the vehicle 10A has merged in front of the vehicle 10B, based on the captured images supplied from the imaging unit 14. Note that this example is a non-limiting example. For example, the communicator 15 of the vehicle 10A may transmit, to the vehicle 10B2, data indicating that the vehicle 10A has merged. The communicator 15 of the vehicle 10B2 may transmit, to the vehicle 10A, data indicating that the vehicle 10A has merged in front of the vehicle 10B2. The merge completion checking unit 24 may check the completion of the merge assist process, based on a result of such communication.

The notification processing unit 25 may be configured to notify the occupant of the vehicle 10 of information using the user interface 16.

The external environment detecting unit 26 may be configured to detect an environment around the vehicle 10, based on the captured images supplied from the imaging unit 14.

The driving mode setting unit 27 may be configured to set one of an automated driving mode and a manual driving mode, based on, for example, operation of the driver. The automated driving mode may be a mode in which the vehicle 10 travels automatedly, and the manual driving mode may be a mode in which the vehicle 10 travels based on a driving operation of the driver.

The travel control unit 28 may be configured to control traveling of the vehicle 10 by controlling operation of, for example, a power source such as a motor or an engine, a steering device, and a braking device of the vehicle 10. When the vehicle 10 is traveling in the automated driving mode, the travel control unit 28 may control traveling of the vehicle 10, based on a processing result of an automated driving control. When the vehicle 10 is traveling in the manual driving mode, the travel control unit 28 may control traveling of the vehicle 10, based on the driving operation of the driver.

In one embodiment, the communicator 15 may serve as a "receiver" and a "transmitter". The communicator 15 may include one or more processors, and one or more non-transitory tangible memories each communicably coupled to at least one of the one or more processors of a telematics control unit of the vehicle, and the one or more processors and the one or more non-transitory tangible memories are configured to function as the "receiver" and the "transmitter". In one embodiment, the merging point P may serve as a "merging point". In one embodiment, the vehicle 10A may serve as a "first vehicle". In one embodiment, the request signal REQ may serve as a "first request signal" and a "second request signal". In one embodiment, the acknowledgment signal ACK may serve as an "acknowledgment signal".

Operation and Workings

An operation and workings of the merge assist system 1 according to the example embodiment will now be described.

Overview of Overall Operation

An operation of the merge assist apparatus 9 of the merge assist system 1 will now be described with reference to FIGS. 1 and 2. The vehicle 10A that intends to merge into the traveling path on which multiple vehicles are traveling may transmit the request signal REQ (the request signal REQ1) including the data regarding the position of the merging point P ahead of the vehicle 10A. The vehicle 10B (for example, the vehicle 10B1) traveling on the traveling path to which the vehicle 10A intends to merge determines whether the vehicle 10B (10B1) is able to sufficiently decelerate before the vehicle 10B (10B1) reaches the merging point P, based on the data regarding the position of the merging point P included in the request signal REQ1. If the vehicle 10B1 is able to sufficiently decelerate before the vehicle 10B1 reaches the merging point P, the vehicle 10B1 may transmit the acknowledgment signal ACK to the vehicle 10A and decelerate before the vehicle 10B1 reaches the merging point P to make it possible for the vehicle 10A to merge. If the vehicle 10B1 is unable to sufficiently decelerate before the vehicle 10B1 reaches the merging point P, the vehicle 10B1 transmits the request signal REQ (the request signal REQ2) including the data regarding the position of the merging point P to another vehicle 10B, such as the vehicle 10B2, traveling behind the vehicle 10B1. The vehicle 10B2 may determine whether the vehicle 10B2 is able to sufficiently decelerate before the vehicle 10B2 reaches the merging point P, based on the data regarding the position of the merging point P included in the request signal REQ2. If the vehicle 10B2 is able to sufficiently decelerate before the vehicle 10B2 reaches the merging point P, the vehicle 10B2 may transmit the acknowledgment signal ACK to the vehicle 10A and decelerate before the vehicle 10B2 reaches the merging point P to make it possible for the vehicle 10A to merge.

Details of Operation

An operation of the merge assist system 1 will hereafter be described in detail with some examples. Note that in this example, a description is given of an example in which vehicles travel on a left side of a middle of the traveling path, which may be referred to as a left-hand traffic; however, this example is a non-limiting example. Any embodiment of the disclosure may be applied to an example in which vehicles travel on a right side of the middle of the traveling path, which may be referred to as a right-hand traffic.

Case C1

A case will now be described in which the vehicles 10B1 and 10B2 that have received the request signal REQ1 transmitted from the vehicle 10A are able to sufficiently decelerate before the vehicles 10B1 and 10B2 reach the merging point P.

Figure 3:
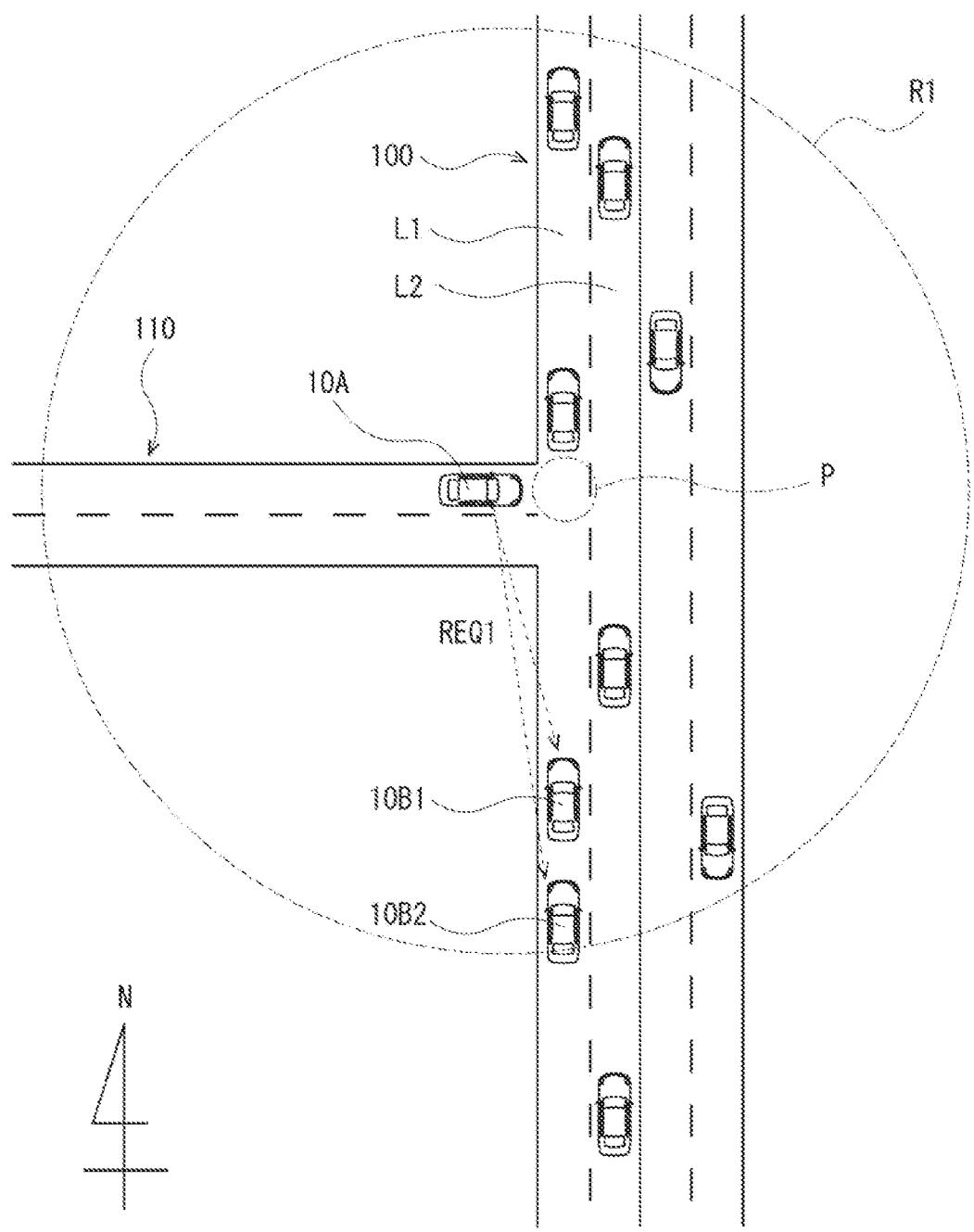
FIG. 3 is an explanatory diagram illustrating an example operation of the merge assist system illustrated in FIG. 1.

FIG. 3 illustrates an example operation of the merge assist system 1 in Case C1. In this example, a traveling path 100 may extend in a north-south direction, and a traveling path 110 may extend in an east-west direction. The traveling path 100 may include a total of four lanes including two lanes each way in this example. In FIG. 3, multiple vehicles 10 may be traveling from the south toward the north in two lanes (a lane L1 and a lane L2) on the left side of the traveling path 100. The traveling path 110 may be on the west side of the traveling path 100 and connect with the traveling path 100. The traveling path 110 may include a total of two lanes including one lane each way in this example. On the traveling path 110, the vehicle 10A traveling from the west toward the east may be trying to merge into the lane L1 of the traveling path 100. Because multiple vehicles 10 are traveling on the lane L1, the vehicle 10A may try to merge into the lane L1 of the traveling path 100 at the right time. On the lane L1 of the traveling path 100, the vehicles 10B1 and 10B2 may be traveling toward the point (the merging point P) at which the vehicle 10A plans to merge. In this example, the vehicles 10B1 and 10B2 may be traveling in the automated driving mode.

In this example, due to multiple vehicles 10 traveling on the lane L1, the vehicle 10A may have a hard time merging into the lane L1. In this case, if the vehicle 10A has a hard time merging into the lane L1 for a predetermined time, such as some tens of seconds, the vehicle 10A may transmit the request signal REQ1. This may start the merge assist process performed by the merge assist system 1.

Figure 4:
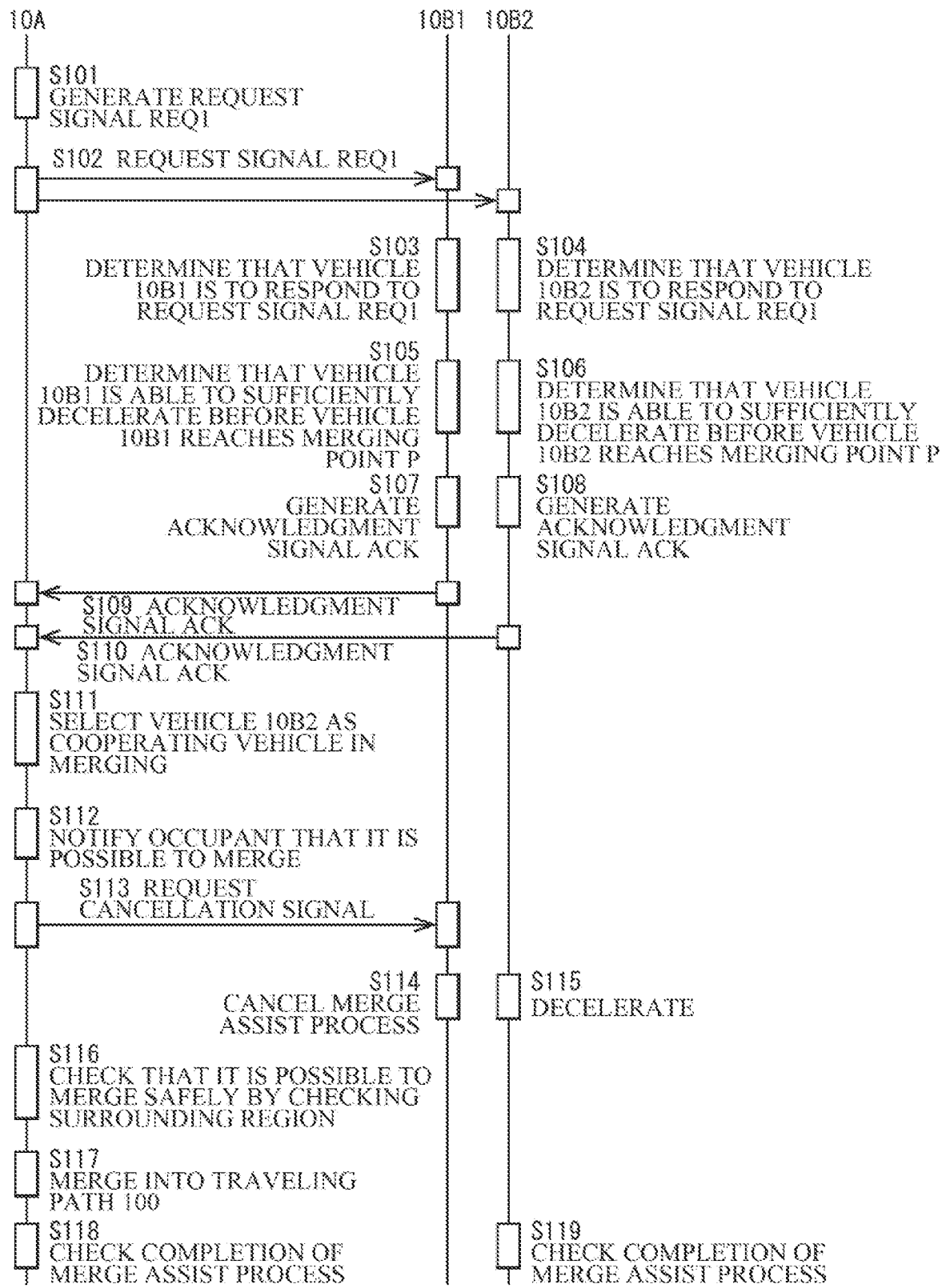
FIG. 4 is a sequence diagram illustrating an example of a merge assist process performed by the merge assist system illustrated in FIG. 1.

FIG. 4 illustrates an example of the merge assist process in Case C1.

The communication processing unit 21 of the vehicle 10A may generate the request signal REQ1 (step S101). For example, the communication processing unit 21 of the vehicle 10A may generate the request signal REQ1 including the data regarding the position of the merging point P ahead of the vehicle 10A supplied from the navigator 11 and identifier data of the vehicle 10A.

Thereafter, the communicator 15 of the vehicle 10A may transmit the request signal REQ1 (step S102). The communicator 15 of the vehicle 10A may broadcast the request signal REQ1 to multiple vehicles 10 including the vehicles 10B1 and 10B2 within a communication range R1 illustrated in FIG. 3. FIG. 3 illustrates the communication range R1 using a circle with its center at the vehicle 10A. The communicator 15 of each of the vehicles 10 within the communication range R1 may receive the request signal REQ1.

In each of the vehicles 10 within the communication range R1, the determination unit 22 may determine whether to respond to the request signal REQ1 by determining, based on the data supplied from the navigator 11, whether the position of the vehicle 10 is before the merging point P and whether the lane on which the vehicle 10 is traveling is the lane to which the vehicle 10A is to merge.

The determination unit 22 of the vehicle 10B1 may determine that the vehicle 10B1 is to respond to the request signal REQ1 (step S103). For example, the vehicle 10B1 may be traveling toward the merging point P on the lane L1 on the leftmost side. The lane L1 may be the lane into which the vehicle 10A will enter when the vehicle 10A merges into the traveling path 100. Thus, the determination unit 22 of the vehicle 10B1 may determine that the vehicle 10B1 is to respond to the request signal REQ1. Similarly, the determination unit 22 of the vehicle 10B2 may determine that the vehicle 10B2 is to respond to the request signal REQ1 (step S104). Note that, for example, the determination unit 22 of each of the vehicles 10 that are traveling on the lane L1 and have already passed the merging point P and the determination unit 22 of each of the vehicles 10 traveling on the lane L2 may determine that the vehicle 10 is not to respond to the request signal REQ1.

Thereafter, the determination unit 22 of the vehicle 10B1 may calculate a distance between the position of the vehicle 10B1 and the merging point P, based on the data regarding the position of the merging point P included in the request signal REQ1. The determination unit 22 may determine whether the vehicle 10B1 is able to sufficiently decelerate before the vehicle 10B1 reaches the merging point P, based on the speed of the vehicle 10B1 and the distance to the merging point P. Similarly, the determination unit 22 of the vehicle 10B2 may determine whether the vehicle 10B2 is able to sufficiently decelerate before the vehicle 10B2 reaches the merging point P. In this example, the determination unit 22 of the vehicle 10B1 may determine that the vehicle 10B1 is able to sufficiently decelerate before the vehicle 10B1 reaches the merging point P (step S105), and the determination unit 22 of the vehicle 10B2 may determine that the vehicle 10B2 is able to sufficiently decelerate before the vehicle 10B2 reaches the merging point P (step S106).

Thereafter, the communication processing unit 21 of the vehicle 10B1 may generate the acknowledgment signal ACK in response to the request signal REQ1 received in step S102 (step S107). In this example, the acknowledgment signal ACK may include data regarding the position of the vehicle 10B1. Additionally, the acknowledgment signal ACK may further include data regarding a type and a color of the vehicle 10B1. Similarly, the communication processing unit 21 of the vehicle 10B2 may generate the acknowledgment signal ACK in response to the request signal REQ1 received in step S102 (step S108). In this example, the acknowledgment signal ACK may include data regarding the position of the vehicle 10B2. Additionally, the acknowledgment signal ACK may further include data regarding a type and a color of the vehicle 10B2. The communicator 15 of each of the vehicles 10B1 and 10B2 may transmit the acknowledgment signal ACK to the vehicle 10A using the identifier data of the vehicle 10A included in the request signal REQ1 (steps S109 and S110). The communicator 15 of the vehicle 10A may receive these two acknowledgment signals ACK.

Thereafter, the cooperating vehicle determination unit 23 of the vehicle 10A may select, in this example, the vehicle 10B2, which is one of the vehicles 10B1 and 10B2, as the cooperating vehicle in merging, based on the two acknowledgment signals ACK (step S111). For example, the cooperating vehicle determination unit 23 may select the vehicle 10B2 farther from the vehicle 10A among the vehicles 10B1 and 10B2 as the cooperating vehicle, based on the data regarding the position of the vehicle 10B1 included in the acknowledgment signal ACK transmitted from the vehicle 10B1 and the data regarding the position of the vehicle 10B2 included in the acknowledgment signal ACK transmitted from the vehicle 10B2. Note that this example is a non-limiting example. For example, the cooperating vehicle determination unit 23 may select, as the cooperating vehicle, the vehicle 10B that has transmitted the acknowledgment signal ACK that has been received first among the two acknowledgment signals ACK.

Thereafter, the notification processing unit 25 of the vehicle 10A may notify an occupant of the vehicle 10A that it is possible for the vehicle 10A to merge into the traveling path 100 soon using the user interface 16 (step S112). For example, when the acknowledgment signal ACK includes the data regarding the type and the color of the vehicle 10B2 that has transmitted the acknowledgment signal ACK, the notification processing unit 25 may notify the occupant of the vehicle 10A of the information regarding the type and the color of the vehicle 10B2 using the user interface 16. In this case, it is possible for a driver of the vehicle 10A to grasp what kind of vehicle will cooperate in merging. Thus, for example, it is possible for the driver to perform the driving operation to merge while having a clear grasp of the vehicle that will cooperate, making it possible for the vehicle 10A to easily merge.

Thereafter, the vehicle 10A may transmit a request cancellation signal to the vehicle 10B1 that is not the cooperating vehicle in merging (step S113). For example, the communication processing unit 21 of the vehicle 10A may generate the request cancellation signal, and the communicator 15 may transmit the request cancellation signal to the vehicle 10B1 that is not the cooperating vehicle in merging. The communicator 15 of the vehicle 10B1 may receive the request cancellation signal and cancel the merge assist process (step S114). This makes it possible for the vehicle 10B1 to continue traveling without decelerating.

Meanwhile, the travel control unit 28 of the vehicle 10B2 that is the cooperating vehicle in merging may control traveling of the vehicle 10B2 to sufficiently decelerate the vehicle 10B2 before the vehicle 10B2 reaches the merging point P (step S115).

The external environment detecting unit 26 of the vehicle 10A may check that it is possible for the vehicle 10A to merge safely by checking a surrounding region of the vehicle 10A, based on the captured images supplied from the imaging unit 14 (step S116). For example, the external environment detecting unit 26 may check that it is possible for the vehicle 10A to merge safely by checking, for example, that the vehicle 10B2 is approaching the merging point P while being sufficiently decelerated and that there is no one crossing the traveling path 110.

Thereafter, the vehicle 10A may merge into the traveling path 100 (step S117).

Figure 5:
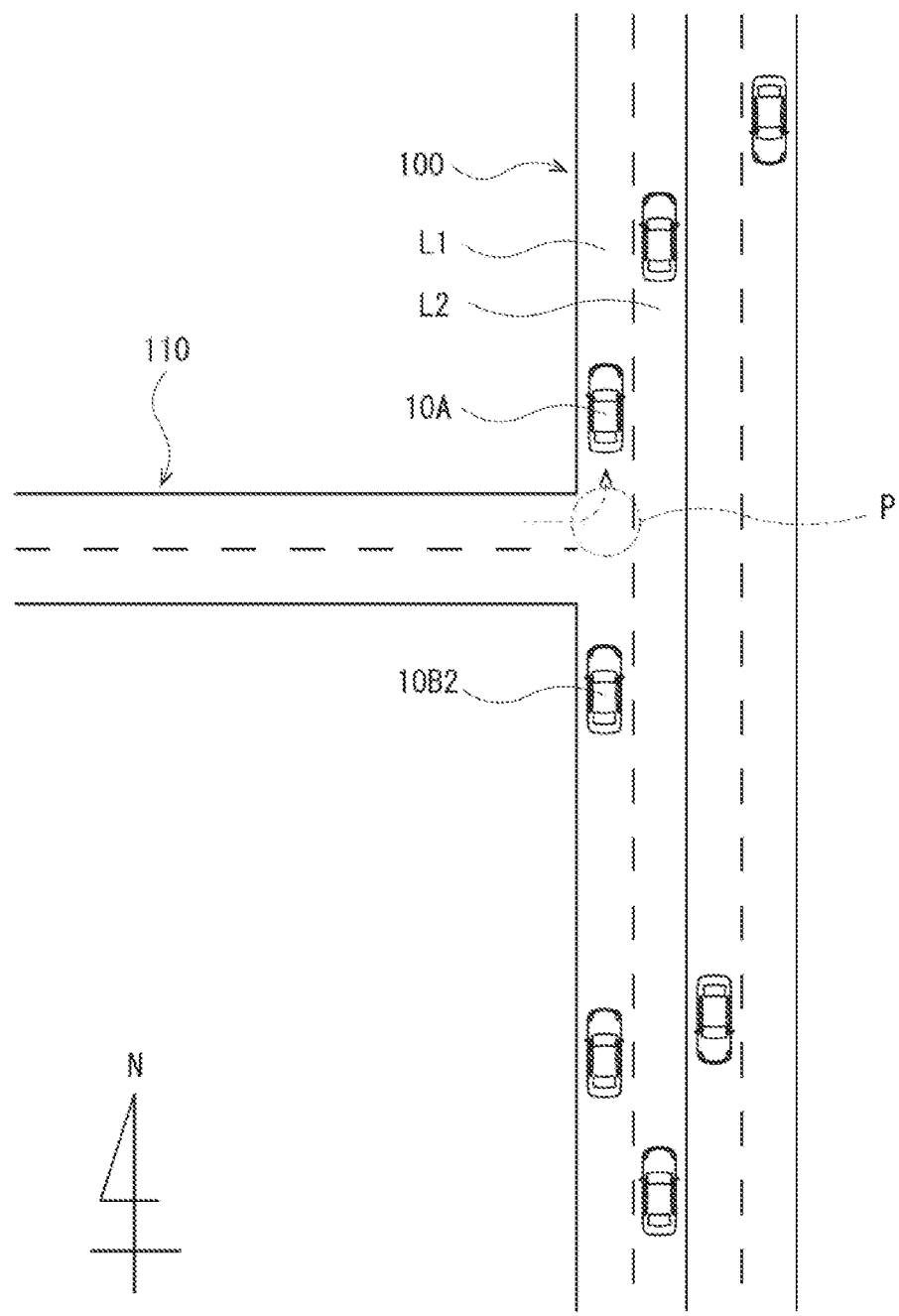
FIG. 5 is another explanatory diagram illustrating the example operation of the merge assist system illustrated in FIG. 1.

FIG. 5 illustrates the state in which the vehicle 10A has merged into the traveling path 100. In this example, the vehicle 10B2 may have sufficiently decelerated before the vehicle 10B2 reaches the merging point P. The vehicle 10A may merge into the lane L1 of the traveling path 100 in front of the vehicle 10B2 that has decelerated. When the vehicle 10A is traveling in the automated driving mode, the travel control unit 28 of the vehicle 10A may control traveling of the vehicle 10A to cause the vehicle 10A to turn left, based on the processing result of the automated driving control. When the vehicle 10A is traveling in the manual driving mode, the travel control unit 28 of the vehicle 10A may control traveling of the vehicle 10A to cause the vehicle 10A to turn left, based on the driving operation of the driver. In this manner, the vehicle 10A may merge into the traveling path 100.

Thereafter, the merge completion checking unit 24 of the vehicle 10A may check the completion of the merge assist process (step S118). For example, the merge completion checking unit 24 of the vehicle 10A may check the completion of the merge assist process by checking that the vehicle 10A has merged, based on, for example, the data supplied from the navigator 11 and the captured images supplied from the imaging unit 14.

The merge completion checking unit 24 of the vehicle 10B2 may check the completion of the merge assist process (step S119). For example, the merge completion checking unit 24 of the vehicle 10B2 may check the completion of the merge assist process by checking that the vehicle 10A has merged in front of the vehicle 10B2, based on the captured images supplied from the imaging unit 14.

Case C2

A case will now be described in which the vehicle 10B1 that has received the request signal REQ1 transmitted from the vehicle 10A is unable to sufficiently decelerate before the vehicle 10B1 reaches the merging point P, and the vehicle 10B2 that has received the request signal REQ2 transmitted from the vehicle 10B1 is able to sufficiently decelerate before the vehicle 10B2 reaches the merging point P.

Figure 6:
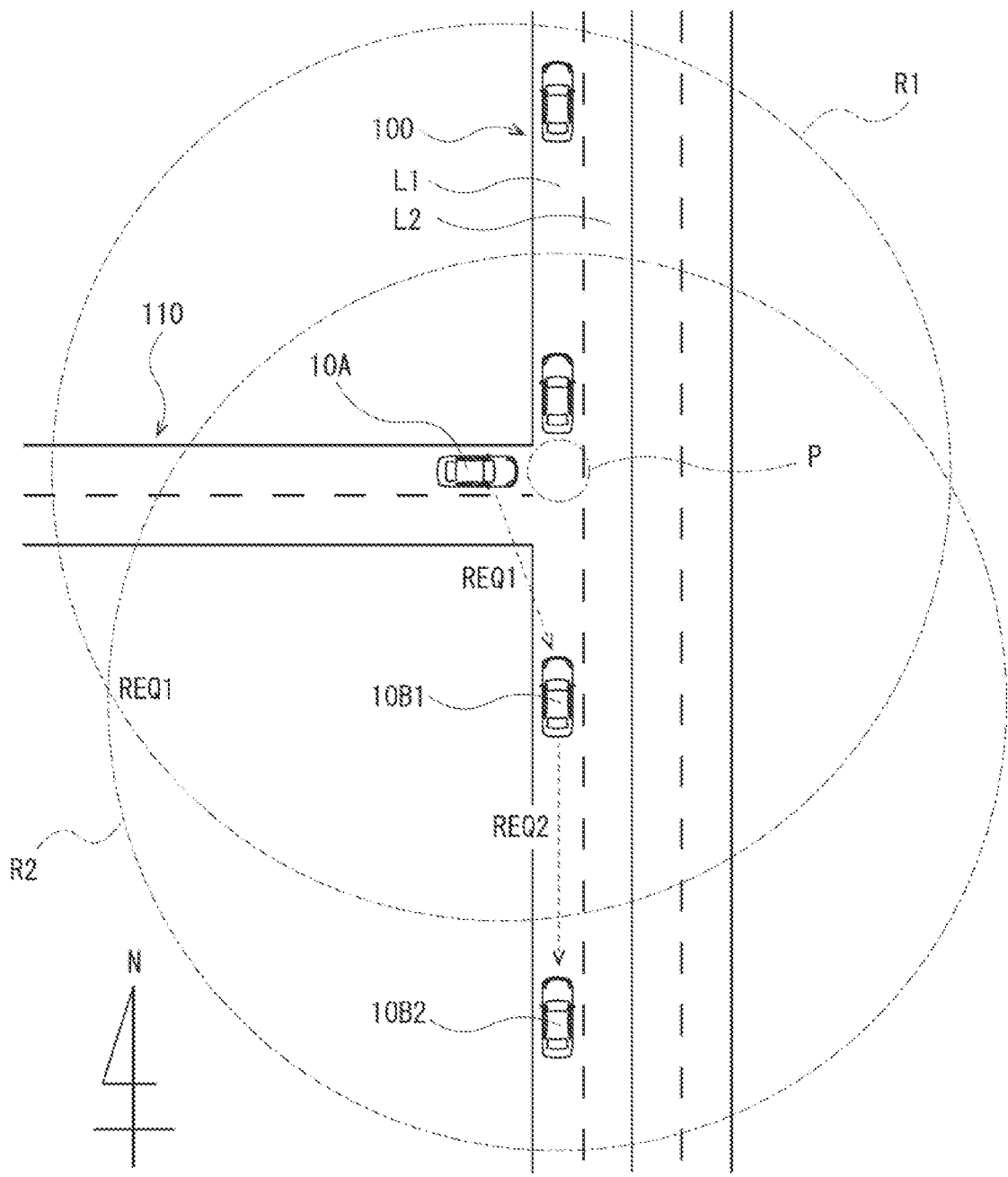
FIG. 6 is an explanatory diagram illustrating another example operation of the merge assist system illustrated in FIG. 1.

FIG. 6 illustrates an example operation of the merge assist system 1 in Case C2. In this example also, the vehicle 10A may be trying to merge into the lane L1 of the traveling path 100 at the right time. On the lane L1 of the traveling path 100, the vehicles 10B1 and 10B2 may be traveling toward the point (the merging point P) at which the vehicle 10A plans to merge. In this example, the vehicles 10B1 and 10B2 may be traveling in the automated driving mode.

Figure 7:
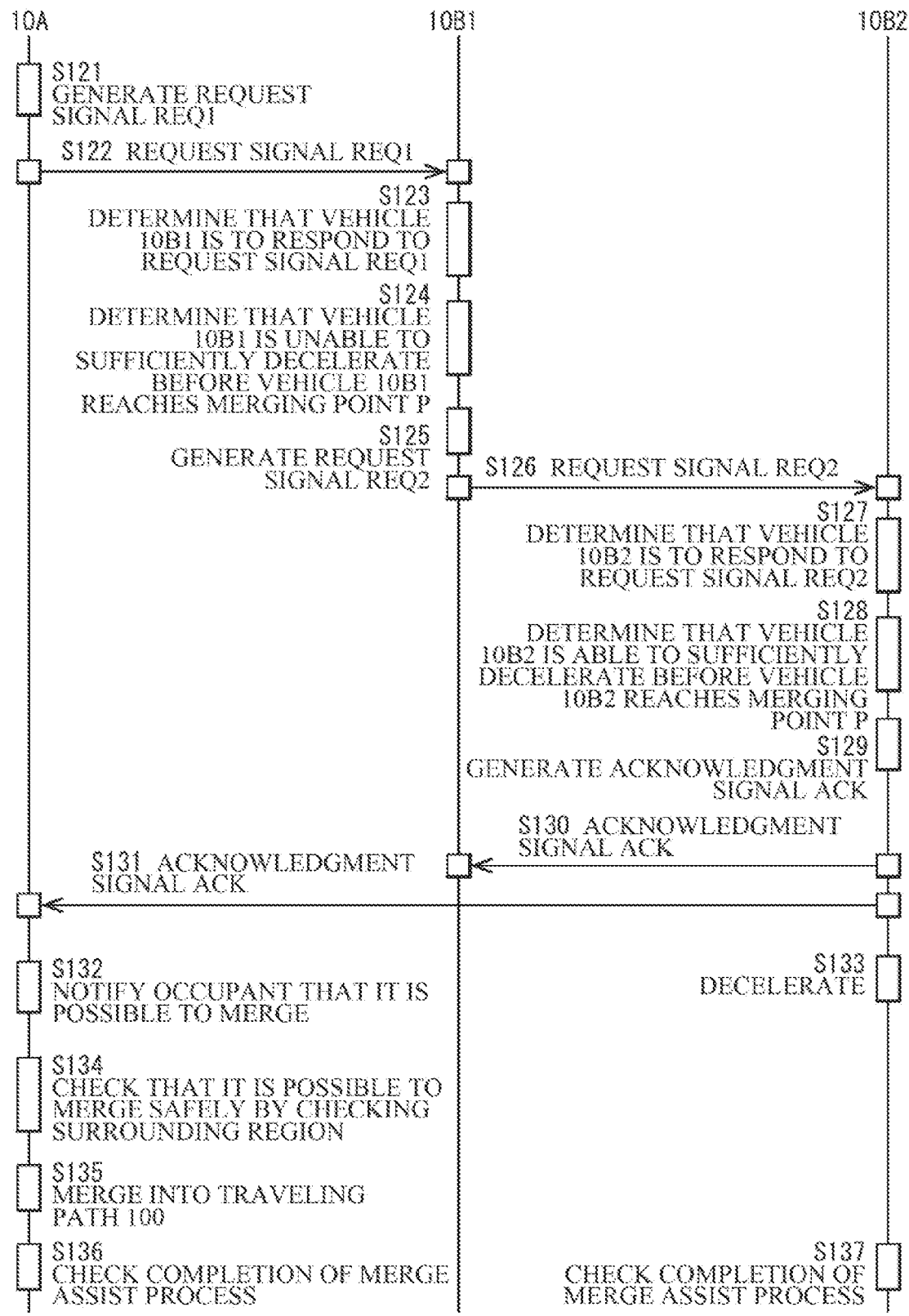
FIG. 7 is a sequence diagram illustrating another example of the merge assist process performed by the merge assist system illustrated in FIG. 1.

FIG. 7 illustrates an example of the merge assist process in Case C2.

In this example also, because the vehicle 10A has a hard time merging into the lane L1 for the predetermined time, such as some tens of seconds, the communication processing unit 21 of the vehicle 10A may generate the request signal REQ1 (step S121). The request signal REQ1 may include the data regarding the position of the merging point P ahead of the vehicle 10A and the identifier data of the vehicle 10A. The communicator 15 of the vehicle 10A may transmit the request signal REQ1 (step S122). The vehicle 10A may broadcast the request signal REQ1 to multiple vehicles 10 including the vehicle 10B1 within the communication range R1 illustrated in FIG. 6. The communicator 15 of each of the vehicles 10 within the communication range R1 may receive the request signal REQ1.

The determination unit 22 of each of the vehicles 10 within the communication range R1 may determine whether to respond to the request signal REQ1. The determination unit 22 of the vehicle 10B1 may determine that the vehicle 10B1 is to respond to the request signal REQ1 (step S123).

Thereafter, the determination unit 22 of the vehicle 10B1 may determine whether the vehicle 10B1 is able to sufficiently decelerate before the vehicle 10B1 reaches the merging point P. In this example, the determination unit 22 of the vehicle 10B1 may determine that the vehicle 10B1 is unable to sufficiently decelerate before the vehicle 10B1 reaches the merging point P (step S124).

Thereafter, the communication processing unit 21 of the vehicle 10B1 may generate the request signal REQ2 (step S125). For example, the communication processing unit 21 of the vehicle 10B1 may generate the request signal REQ2, based on the request signal REQ1 received in step S122. The request signal REQ2 may include the data regarding the position of the merging point P, the identifier data of the vehicle 10A that has transmitted the request signal REQ1, and identifier data of the vehicle 10B1. Thereafter, the communicator 15 of the vehicle 10B1 may transmit the request signal REQ2 (step S126). In this example, because the vehicle 10B1 is unable to sufficiently decelerate before the vehicle 10B1 reaches the merging point P, the vehicle 10B1 may transmit the request signal REQ2 on behalf of the vehicle 10A. The communicator 15 of the vehicle 10B1 may broadcast the request signal REQ2 to multiple vehicles 10 including the vehicle 10B2 within a communication range R2 illustrated in FIG. 6. The communicator 15 of each of the vehicles 10 within the communication range R2 may receive the request signal REQ2.

The determination unit 22 of each of the vehicles 10 within the communication range R2 may determine whether to respond to the request signal REQ2. The determination unit 22 of the vehicle 10B2 may determine that the vehicle 10B2 is to respond to the request signal REQ2 (step S127).

Thereafter, the determination unit 22 of the vehicle 10B2 may determine whether the vehicle 10B2 is able to sufficiently decelerate before the vehicle 10B2 reaches the merging point P. In this example, the determination unit 22 of the vehicle 10B2 may determine that the vehicle 10B2 is able to sufficiently decelerate before the vehicle 10B2 reaches the merging point P (step S128).

Thereafter, the communication processing unit 21 of the vehicle 10B2 may generate the acknowledgment signal ACK in response to the request signal REQ2 received in step S126 (step S129). In this example, the acknowledgment signal ACK may include the data regarding the position of the vehicle 10B2. Additionally, the acknowledgment signal ACK may further include the data regarding the type and the color of the vehicle 10B2. Thereafter, the communicator 15 of the vehicle 10B2 may transmit the acknowledgment signal ACK to the vehicle 10B1 using the identifier data of the vehicle 10B1 included in the request signal REQ2 (steps S130). The communicator 15 of the vehicle 10B1 may receive the acknowledgment signal ACK. Additionally, the communicator 15 of the vehicle 10B2 may transmit the acknowledgment signal ACK to the vehicle 10A using the identifier data of the vehicle 10A included in the request signal REQ2 (steps S131). The communicator 15 of the vehicle 10A may receive the acknowledgment signal ACK. Note that if the vehicle 10B2 is located away from the vehicle 10A, the vehicle 10A may be unable to receive the acknowledgment signal ACK. Given the circumstances, the vehicle 10B2 may, for example, transmit the acknowledgment signal ACK multiple times until the vehicle 10A receives the acknowledgment signal ACK.

Thereafter, the notification processing unit 25 of the vehicle 10A may notify the occupant of the vehicle 10A that it is possible for the vehicle 10A to merge into the traveling path 100 soon using the user interface 16 (step S132). For example, when the acknowledgment signal ACK includes the data regarding the type and the color of the vehicle 10B2 that has transmitted the acknowledgment signal ACK, the notification processing unit 25 may notify the occupant of the vehicle 10A of the information regarding the type and the color of the vehicle 10B2 using the user interface 16.

The travel control unit 28 of the vehicle 10B2 that is the cooperating vehicle in merging may control traveling of the vehicle 10B2 to sufficiently decelerate the vehicle 10B2 before the vehicle 10B2 reaches the merging point P (step S133).

The external environment detecting unit 26 of the vehicle 10A may check that it is possible for the vehicle 10A to merge safely by checking a surrounding region of the vehicle 10A, based on the captured images supplied from the imaging unit 14 (step S134).

Thereafter, the vehicle 10A may merge into the traveling path 100 (step S135).

Thereafter, the merge completion checking unit 24 of the vehicle 10A may check the completion of the merge assist process (step S136). For example, the merge completion checking unit 24 of the vehicle 10A may check the completion of the merge assist process by checking that the vehicle 10A has merged, based on, for example, the data supplied from the navigator 11 and the captured images supplied from the imaging unit 14.

Additionally, the merge completion checking unit 24 of the vehicle 10B2 may check the completion of the merge assist process (step S137). For example, the merge completion checking unit 24 of the vehicle 10B2 may check the completion of the merge assist process by checking that the vehicle 10A has merged in front of the vehicle 10B2, based on the captured images supplied from the imaging unit 14.

The vehicle 10B1 may serve as an own vehicle. In one embodiment, the vehicle 10B1 may serve as a "relevant vehicle" or a "vehicle". In one embodiment, the vehicle 10B2 may serve as a "second vehicle". In one embodiment, the request signal REQ1 may serve as the "first request signal". In one embodiment, the request signal REQ2 may serve as the "second request signal".

Case C3

A case will now be described in which: the vehicle 10B1 that has received the request signal REQ1 transmitted from the vehicle 10A is unable to sufficiently decelerate before the vehicle 10B1 reaches the merging point P; the vehicle 10B2 that has received the request signal REQ2 transmitted from the vehicle 10B1 is unable to sufficiently decelerate before the vehicle 10B2 reaches the merging point P; and a vehicle 10B3 that has received a request signal REQ3 transmitted from the vehicle 10B2 is able to sufficiently decelerate before the vehicle 10B3 reaches the merging point P.

Figure 8:
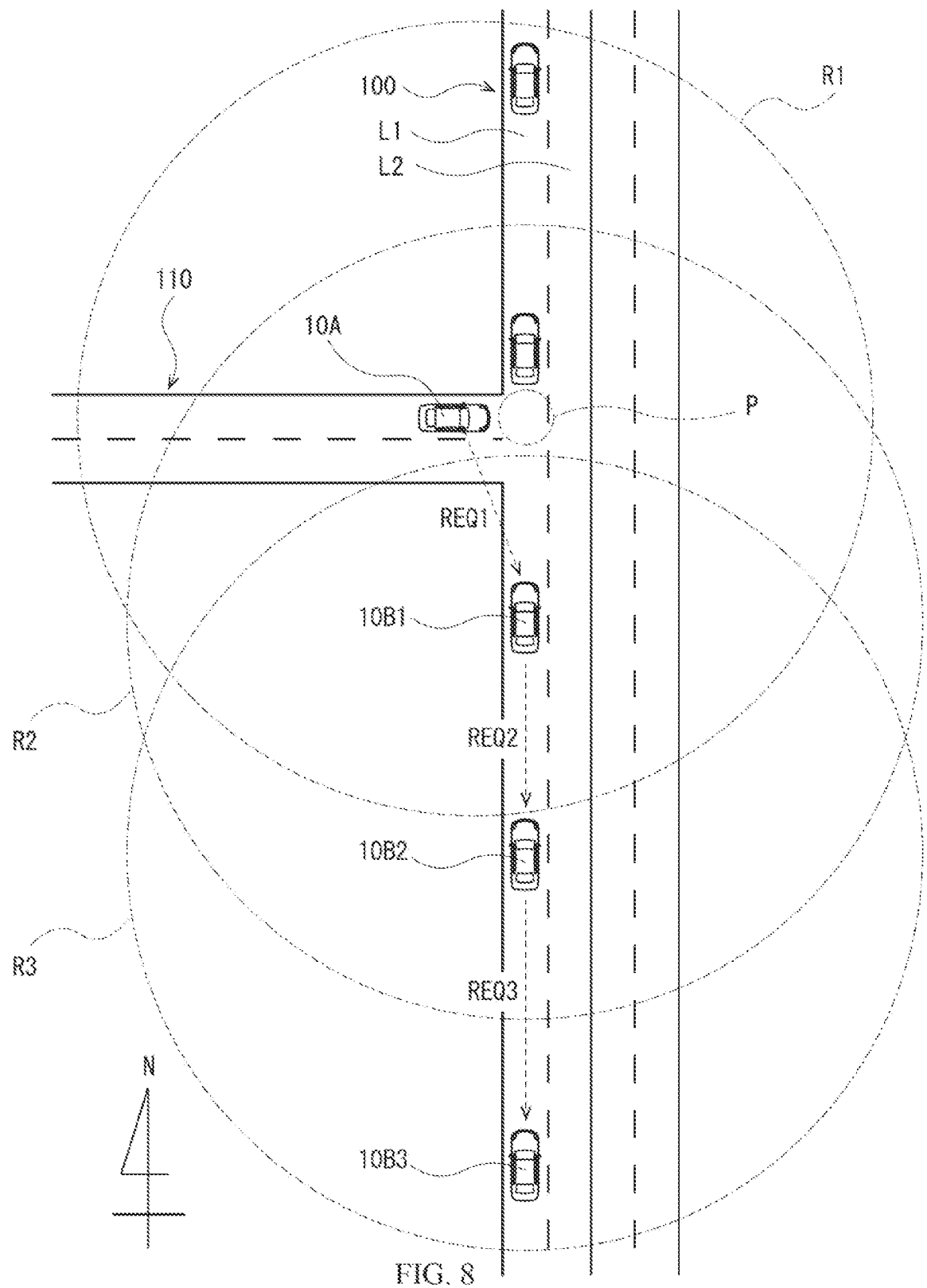
FIG. 8 is an explanatory diagram illustrating another example operation of the merge assist system illustrated in FIG. 1.

FIG. 8 illustrates an example operation of the merge assist system 1 in Case C3. In this example also, the vehicle 10A may be trying to merge into the lane L1 of the traveling path 100 at the right time. On the lane L1 of the traveling path 100, the vehicles 10B1, 10B2, and 10B3 may be traveling toward the point (the merging point P) at which the vehicle 10A plans to merge. In this example, the vehicles 10B1 to 10B3 may be traveling in the automated driving mode.

Figure 9A:
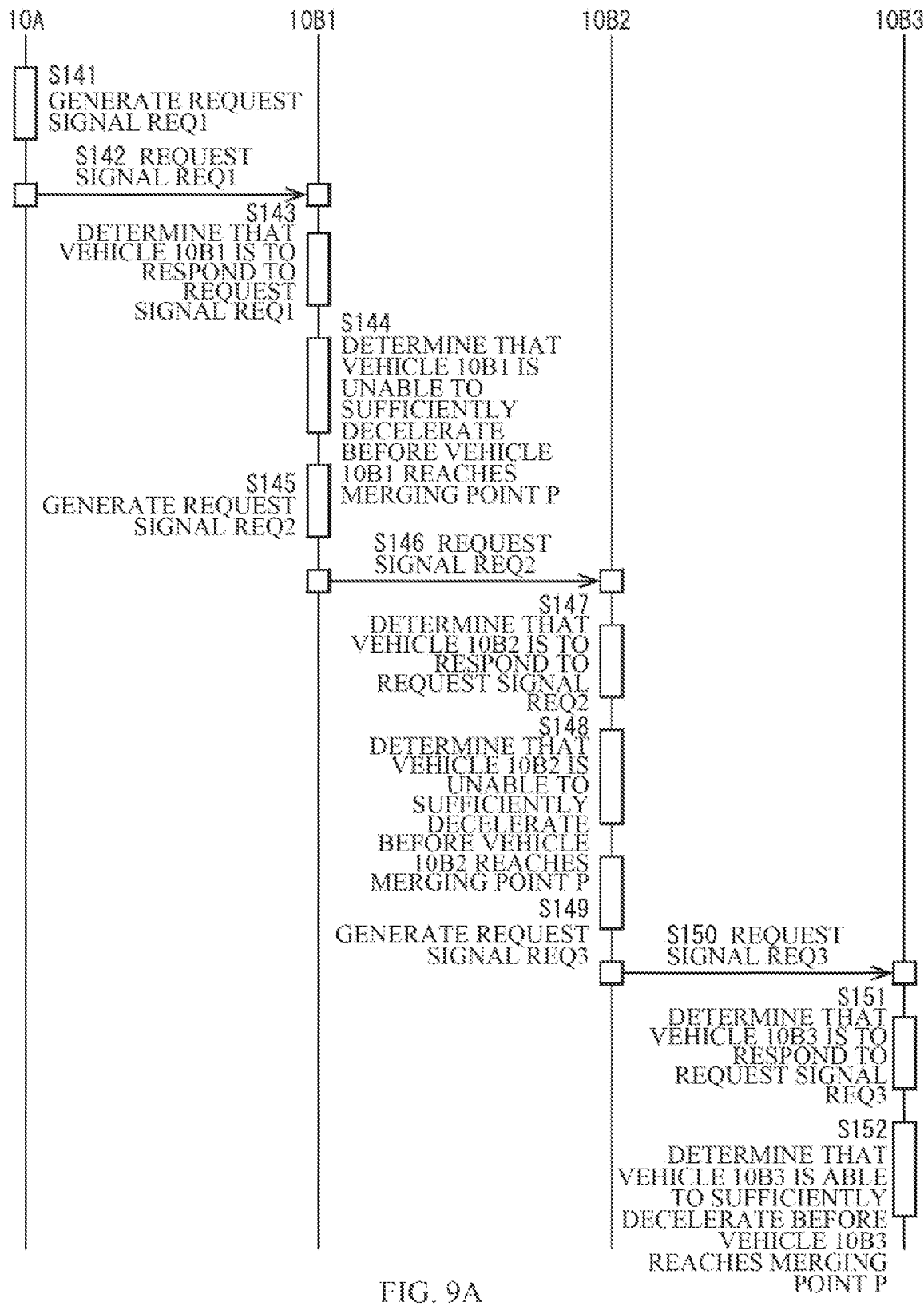
FIG. 9A is a sequence diagram illustrating another example of the merge assist process performed by the merge assist system illustrated in FIG. 1.
Figure 9B:
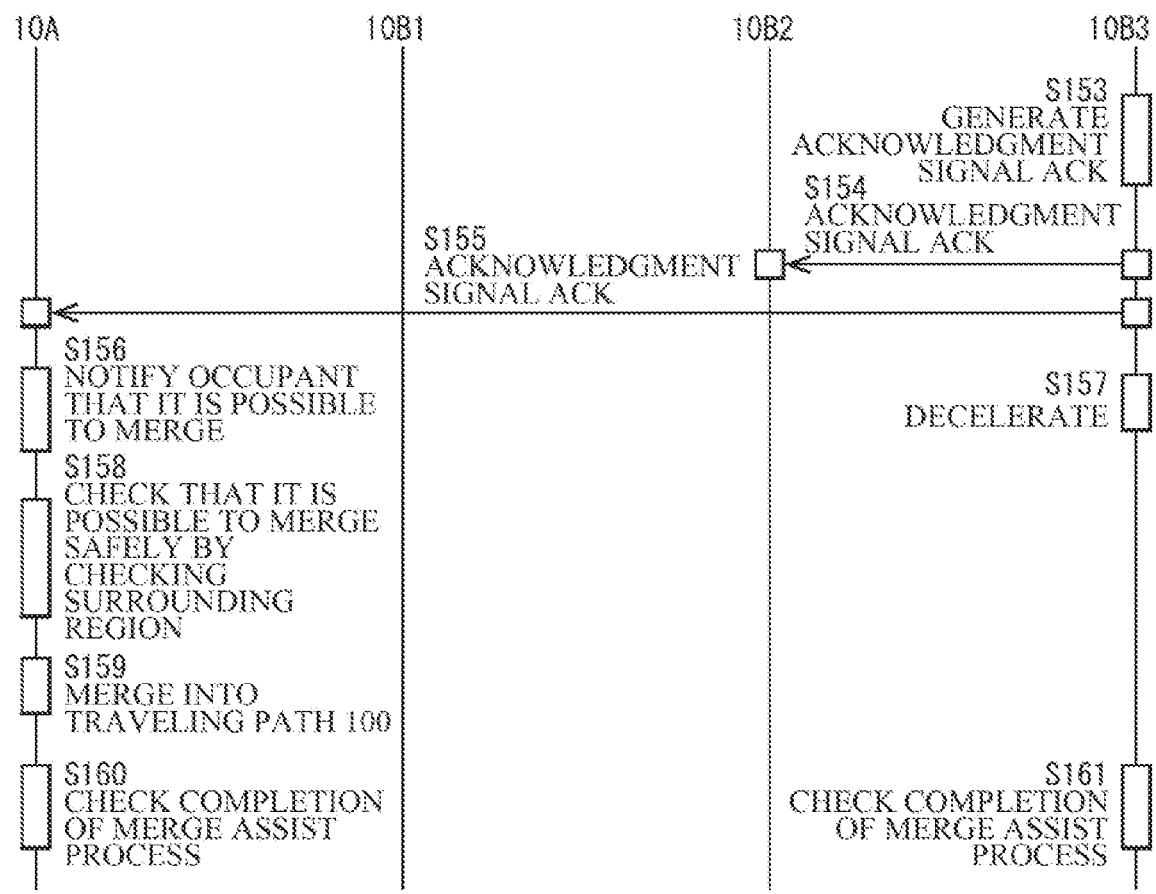
FIG. 9B is a sequence diagram illustrating the other example of the merge assist process performed by the merge assist system illustrated in FIG. 1.

FIGS. 9A and 9B illustrate an example of the merge assist process in Case C3.

In this example also, because the vehicle 10A has a hard time merging into the lane L1 for the predetermined time, such as some tens of seconds, the communication processing unit 21 of the vehicle 10A may generate the request signal REQ1 (step S141). The request signal REQ1 may include the data regarding the position of the merging point P ahead of the vehicle 10A and the identifier data of the vehicle 10A. Thereafter, the communicator 15 of the vehicle 10A may transmit the request signal REQ1 (step S142). The vehicle 10A may broadcast the request signal REQ1 to multiple vehicles 10 including the vehicle 10B1 within the communication range R1 illustrated in FIG. 8. The communicator 15 of each of the vehicles 10 within the communication range R1 may receive the request signal REQ1.

The determination unit 22 of each of the vehicles 10 within the communication range R1 may determine whether to respond to the request signal REQ1. The determination unit 22 of the vehicle 10B1 may determine that the vehicle 10B1 is to respond to the request signal REQ1 (step S143).

Thereafter, the determination unit 22 of the vehicle 10B1 may determine whether the vehicle 10B1 is able to sufficiently decelerate before the vehicle 10B1 reaches the merging point P. In this example, the determination unit 22 of the vehicle 10B1 may determine that the vehicle 10B1 is unable to sufficiently decelerate before the vehicle 10B1 reaches the merging point P (step S144).

Thereafter, the communication processing unit 21 of the vehicle 10B1 may generate the request signal REQ2 (step S145). For example, the communication processing unit 21 of the vehicle 10B1 may generate the request signal REQ2, based on the request signal REQ1 received in step S142. The request signal REQ2 may include the data regarding the position of the merging point P, the identifier data of the vehicle 10A that has transmitted the request signal REQ1, and the identifier data of the vehicle 10B1. Thereafter, the communicator 15 of the vehicle 10B1 may transmit the request signal REQ2 (step S146). In this example, because the vehicle 10B1 is unable to sufficiently decelerate before the vehicle 10B1 reaches the merging point P, the vehicle 10B1 may transmit the request signal REQ2 on behalf of the vehicle 10A. The communicator 15 of the vehicle 10B1 may broadcast the request signal REQ2 to multiple vehicles 10 including the vehicle 10B2 within the communication range R2 illustrated in FIG. 8. The communicator 15 of each of the vehicles 10 within the communication range R2 may receive the request signal REQ2.

The determination unit 22 of each of the vehicles 10 within the communication range R2 may determine whether to respond to the request signal REQ2. The determination unit 22 of the vehicle 10B2 may determine that the vehicle 10B2 is to respond to the request signal REQ2 (step S147).

Thereafter, the determination unit 22 of the vehicle 10B2 may determine whether the vehicle 10B2 is able to sufficiently decelerate before the vehicle 10B2 reaches the merging point P. In this example, the determination unit 22 of the vehicle 10B2 may determine that the vehicle 10B2 is unable to sufficiently decelerate before the vehicle 10B2 reaches the merging point P (step S148).

Thereafter, the communication processing unit 21 of the vehicle 10B2 may generate the request signal REQ3 (step S149). For example, the communication processing unit 21 of the vehicle 10B2 may generate the request signal REQ3, based on the request signal REQ2 received in step S146. The request signal REQ3 may include the data regarding the position of the merging point P, the identifier data of the vehicle 10A that has transmitted the request signal REQ1, and identifier data of the vehicle 10B2. Thereafter, the communicator 15 of the vehicle 10B2 may transmit the request signal REQ3 (step S150). In this example, because the vehicle 10B2 is unable to sufficiently decelerate before the vehicle 10B2 reaches the merging point P, the vehicle 10B2 may transmit the request signal REQ3 on behalf of the vehicle 10A. The communicator 15 of the vehicle 10B2 may broadcast the request signal REQ3 to multiple vehicles 10 including the vehicle 10B3 within a communication range R3 illustrated in FIG. 8. The communicator 15 of each of the vehicles 10 within the communication range R3 may receive the request signal REQ3.

The determination unit 22 of each of the vehicles 10 within the communication range R3 may determine whether to respond to the request signal REQ3. The determination unit 22 of the vehicle 10B3 may determine that the vehicle 10B3 is to respond to the request signal REQ3 (step S151).

Thereafter, the determination unit 22 of the vehicle 10B3 may determine whether the vehicle 10B3 is able to sufficiently decelerate before the vehicle 10B3 reaches the merging point P. In this example, the determination unit 22 of the vehicle 10B3 may determine that the vehicle 10B3 is able to sufficiently decelerate before the vehicle 10B3 reaches the merging point P (step S152).

Thereafter, the communication processing unit 21 of the vehicle 10B3 may generate an acknowledgment signal ACK in response to the request signal REQ3 received in step S150 (step S153). In this example, the acknowledgment signal ACK may include data regarding the position of the vehicle 10B3. Additionally, the acknowledgment signal ACK may further include data regarding a type and a color of the vehicle 10B3. Thereafter, the communicator 15 of the vehicle 10B3 may transmit the acknowledgment signal ACK to the vehicle 10B2 using the identifier data of the vehicle 10B2 included in the request signal REQ3 (steps S154). The communicator 15 of the vehicle 10B2 may receive the acknowledgment signal ACK. Additionally, the communicator 15 of the vehicle 10B3 may transmit the acknowledgment signal ACK to the vehicle 10A using the identifier data of the vehicle 10A included in the request signal REQ3 (steps S155). The communicator 15 of the vehicle 10A may receive the acknowledgment signal ACK. Note that if the vehicle 10B3 is located away from the vehicle 10A, the vehicle 10A may be unable to receive the acknowledgment signal ACK. Given the circumstances, the vehicle 10B3 may, for example, transmit the acknowledgment signal ACK multiple times until the vehicle 10A receives the acknowledgment signal ACK.

Thereafter, the notification processing unit 25 of the vehicle 10A may notify the occupant of the vehicle 10A that it is possible for the vehicle 10A to merge into the traveling path 100 soon using the user interface 16 (step S156). For example, when the acknowledgment signal ACK includes the data regarding the type and the color of the vehicle 10B3 that has transmitted the acknowledgment signal ACK, the notification processing unit 25 may notify the occupant of the vehicle 10A of the information regarding the type and the color of the vehicle 10B3 using the user interface 16.

The travel control unit 28 of the vehicle 10B3 that is the cooperating vehicle in merging may control traveling of the vehicle 10B3 to sufficiently decelerate the vehicle 10B3 before the vehicle 10B3 reaches the merging point P (step S157).

The external environment detecting unit 26 of the vehicle 10A may check that it is possible for the vehicle 10A to merge safely by checking a surrounding region of the vehicle 10A, based on the captured images supplied from the imaging unit 14 (step S158).

Thereafter, the vehicle 10A may merge into the traveling path 100 (step S159).

Thereafter, the merge completion checking unit 24 of the vehicle 10A may check the completion of the merge assist process (step S160). For example, the merge completion checking unit 24 of the vehicle 10A may check the completion of the merge assist process by checking that the vehicle 10A has merged, based on, for example, the data supplied from the navigator 11 and the captured images supplied from the imaging unit 14.

Additionally, the merge completion checking unit 24 of the vehicle 10B3 may check the completion of the merge assist process (step S161). For example, the merge completion checking unit 24 of the vehicle 10B3 may check the completion of the merge assist process by checking that the vehicle 10A has merged in front of the vehicle 10B3, based on the captured images supplied from the imaging unit 14.

The vehicle 10B2 may serve as the own vehicle. In one embodiment, the vehicle 10B2 may serve as the "relevant vehicle". In one embodiment, the vehicle 10B3 may serve as the "second vehicle". In one embodiment, the vehicle 10B1 may serve as a "third vehicle". In one embodiment, the request signal REQ2 may serve as the "first request signal". In one embodiment, the request signal REQ3 may serve as the "second request signal".

<Details of Operation of Vehicle 10A>

An operation of the vehicle 10A that intends to merge into the traveling path 100 will now be described in detail.

Figure 10A:
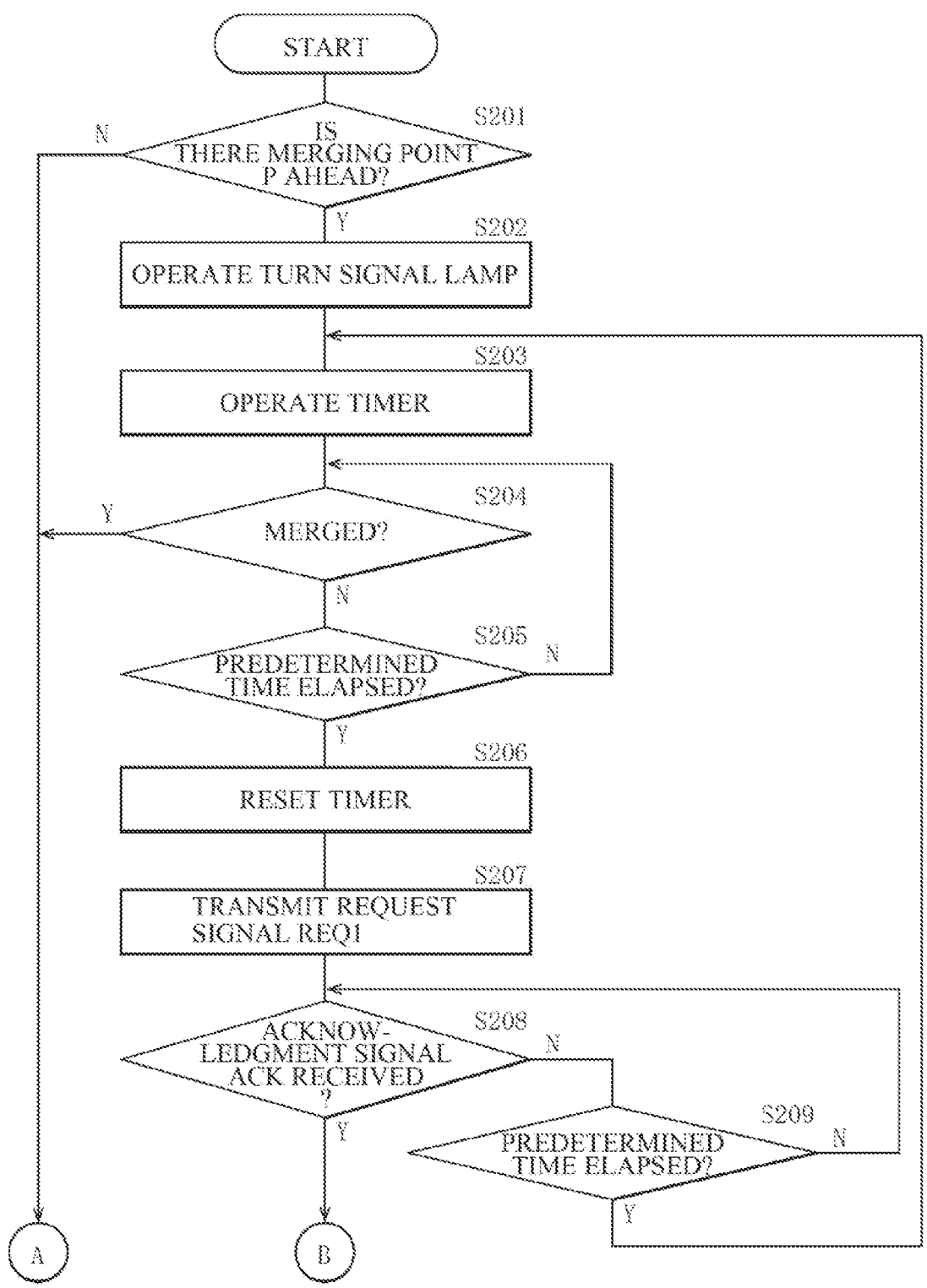
FIG. 10A is a flowchart illustrating an example of the merge assist process performed in a vehicle that intends to merge.
Figure 10B:
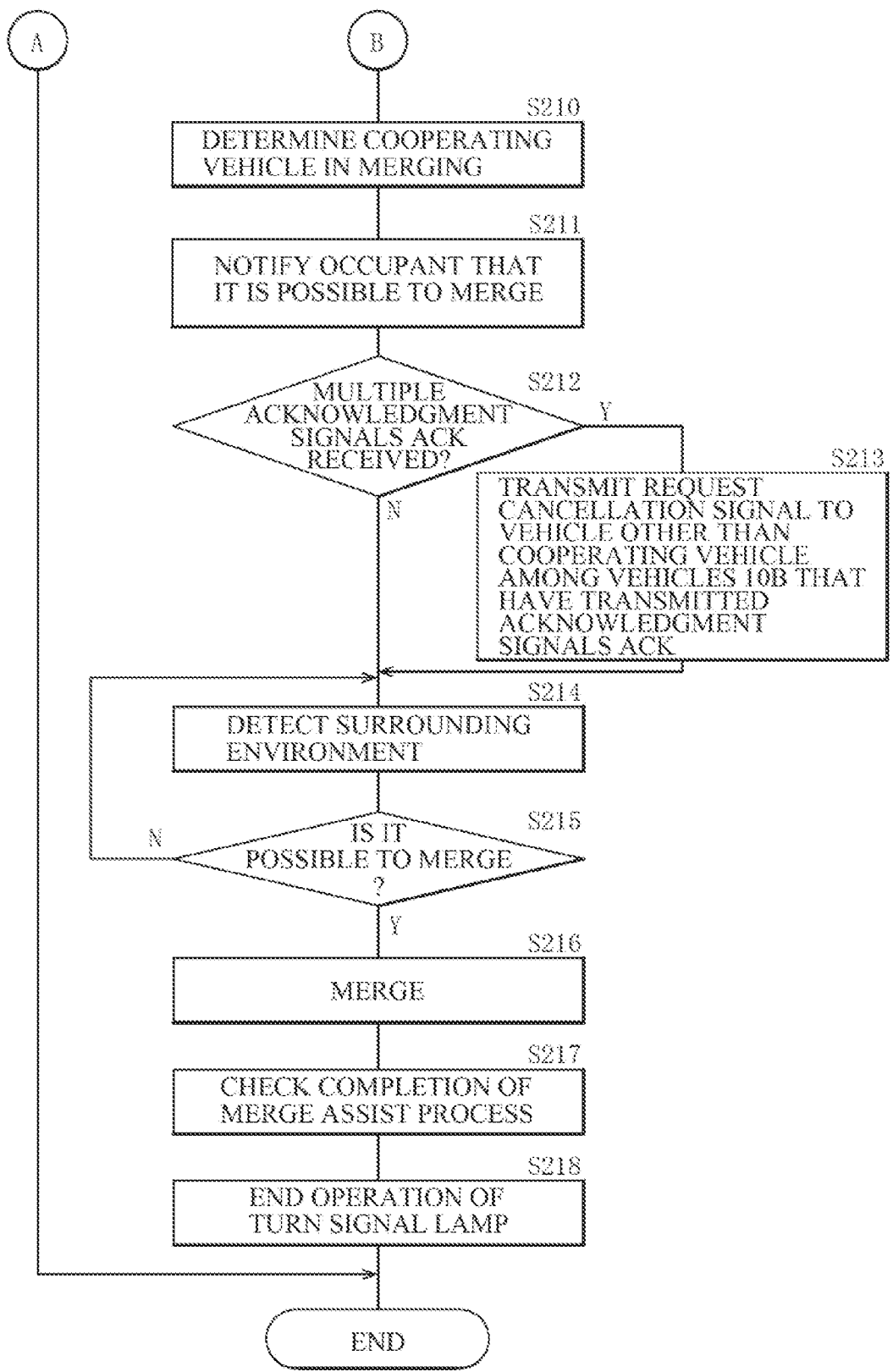
FIG. 10B is a flowchart illustrating the example of the merge assist process performed in the vehicle that intends to merge.

FIGS. 10A and 10B illustrate an example operation of the vehicle 10A. The vehicle 10A may repeatedly execute the processes illustrated in FIGS. 10A and 10B.

First, the processor 20 of the vehicle 10A may check whether there is the merging point P ahead the vehicle 10A, based on the data supplied from the navigator 11 (step S201). If there is no merging point P ahead of the vehicle 10A ("N" in step S201), the flow may end.

In step S201, if there is the merging point P ahead of the vehicle 10A ("Y" in step S201), the flow may proceed to step S202, and the processor 20 may operate a turn signal lamp (step S202). For example, in the examples illustrated in FIGS. 3, 6, and 8, when the vehicle 10A is traveling in the automated driving mode, the travel control unit 28 may operate the turn signal lamp to indicate that the vehicle 10A is to turn left, based on the processing result of the automated driving control. When the vehicle 10A is traveling in the manual driving mode, the travel control unit 28 may operate the turn signal lamp to indicate that the vehicle 10A is to turn left, based on the driving operation of the driver.

Thereafter, the processor 20 may operate a timer (step S203).

Thereafter, the vehicle 10A may attempt to merge into the traveling path 100. When the vehicle 10A is traveling in the automated driving mode, the external environment detecting unit 26 may check whether it is possible for the vehicle 10A to merge into the traveling path 100, based on the captured images supplied from the imaging unit 14. The travel control unit 28 may perform a speed control and a steering control of the vehicle 10A, based on the processing result of the automated driving control. When the vehicle 10A is traveling in the manual driving mode, the external environment detecting unit 26 may check whether it is possible for the vehicle 10A to merge into the traveling path 100, based on the captured images supplied from the imaging unit 14. The travel control unit 28 may perform the speed control and the steering control of the vehicle 10A, based on the driving operation of the driver. For example, if there is hardly any vehicle 10 on the traveling path 100, it is possible for the vehicle 10A to easily merge into the traveling path 100. If, for example, there are many vehicles 10 on the traveling path 100, it is difficult for the vehicle 10A to merge into the traveling path 100.

The processor 20 may check whether the vehicle 10A has successfully merged into the traveling path 100 (step S204). If the vehicle 10A has successfully merged into the traveling path 100 ("Y" in step S204), the flow may end. If the vehicle 10A has not successfully merged into the traveling path 100 ("N" in step S204), the processor 20 may check whether the predetermined time, such as some tens of seconds, has elapsed (step S205). If the predetermined time has not elapsed ("N" in step S205), the processor 20 may repeat the processes of steps S204 and S205 until the predetermined time elapses.

In step S205, if the predetermined time has elapsed ("Y" in step S205), the flow may proceed to step S206, and the processor 20 may reset the timer (step S206).

Thereafter, the vehicle 10A may transmit the request signal REQ1 (step S207). For example, the communication processing unit 21 of the vehicle 10A may generate the request signal REQ1 including the data regarding the position of the merging point P ahead of the vehicle 10A supplied from the navigator 11 and the identifier data of the vehicle 10A. Thereafter, the communicator 15 of the vehicle 10A may broadcast the request signal REQ1.

Thereafter, the communication processing unit 21 may check whether the communicator 15 has received the acknowledgment signal ACK (step S208). The acknowledgment signal ACK may be transmitted from the vehicles 10B1 and 10B2 in Case C1 (FIGS. 3 to 5), from the vehicle 10B2 in Case C2 (FIGS. 6 and 7), and from the vehicle 10B3 in Case C3 (FIGS. 8, 9A, and 9B). If the vehicle 10A has not received the acknowledgment signal ACK ("N" in step S208), the communication processing unit 21 may check whether a predetermined time, such as ten seconds, has elapsed (step S209). If the predetermined time has not elapsed ("N" in step S209), the communication processing unit 21 may repeat the processes of steps S208 and S209 until the predetermined time elapses. If the predetermined time has elapsed ("Y" in step S209), the flow may return to step S203.

In step S208, if the communicator 15 has received the acknowledgment signal ACK ("Y" in step S208), the flow may proceed to step S210, and the cooperating vehicle determination unit 23 may determine the cooperating vehicle in merging (step S210). For example, if the communicator 15 has received, for example, one acknowledgment signal ACK transmitted from one vehicle 10B, the cooperating vehicle determination unit 23 may determine that the vehicle 10B is the cooperating vehicle in merging. Alternatively, if the communicator 15 has received, for example, multiple acknowledgment signals ACK transmitted from multiple vehicles 10B, the cooperating vehicle determination unit 23 may select one of the vehicles 10B as the cooperating vehicle in merging.

Thereafter, the notification processing unit 25 may notify the occupant of the vehicle 10A that it is possible for the vehicle 10A to merge into the traveling path 100 soon using the user interface 16 (step S211).

Thereafter, the communication processing unit 21 may check whether multiple acknowledgment signals ACK have been received (step S212). If the multiple acknowledgment signals ACK have not been received ("N" in step S212), the flow may proceed to step S214. If the multiple acknowledgment signals ACK have been received ("Y" in step S212), the communication processing unit 21 may generate a request cancellation signal, and the communicator 15 may transmit the request cancellation signal to the vehicles 10B other than the vehicle 10B selected as the cooperating vehicle among the vehicles 10B that have transmitted the acknowledgment signals ACK (step S213). The communicator 15 may transmit the request cancellation signal to the vehicles 10B using identifier data, included in the acknowledgment signal ACK, of each of the vehicles 10B that have transmitted the acknowledgment signal ACK.

Thereafter, the external environment detecting unit 26 may detect a surrounding environment of the vehicle 10A, based on the captured images supplied from the imaging unit 14 (step S214). The external environment detecting unit 26 may check whether it is possible for the vehicle 10A to merge (step S215). If it is difficult for the vehicle 10A to merge ("N" in step S215), the external environment detecting unit 26 may repeat the processes of steps S214 and S215 until it is possible for the vehicle 10A to merge.

If it is possible for the vehicle 10A to merge ("Y" in step S215), the vehicle 10A may merge into the traveling path 100 (step S216). For example, when the vehicle 10A is traveling in the automated driving mode, the travel control unit 28 may perform the speed control and the steering control of the vehicle 10A, based on the processing result of the automated driving control. Alternatively, when the vehicle 10A is traveling in the manual driving mode, the travel control unit 28 may perform the speed control and the steering control of the vehicle 10A, based on the driving operation of the driver. In this manner, the vehicle 10A may merge into the traveling path 100.

Thereafter, the merge completion checking unit 24 may check the completion of the merge assist process (step S217). For example, the merge completion checking unit 24 may check the completion of the merge assist process by checking that the vehicle 10A has merged, based on, for example, the data supplied from the navigator 11 and the captured images supplied from the imaging unit 14.

Thereafter, the processor 20 may end the operation of the turn signal lamp (step S218). For example, when the vehicle 10A is traveling in the automated driving mode, the travel control unit 28 may end the operation of the turn signal lamp, based on the processing result of the automated driving control. Alternatively, when the vehicle 10A is traveling in the manual driving mode, the travel control unit 28 may end the operation of the turn signal lamp, based on the driving operation of the driver.

Detail s of Operation of Vehicle 10B

An operation of the vehicle 10B traveling on the traveling path 100 to which the vehicle 10A intends to merge will now be described in detail. The vehicle 10B may include the vehicles 10B1 and 10B2 in Case C1 (FIGS. 3 to 5), the vehicles 10B1 and 10B2 in Case C2 (FIGS. 6 and 7), and the vehicles 10B1 to 10B3 in Case C3 (FIGS. 8, 9A, and 9B).

Figure 11A:
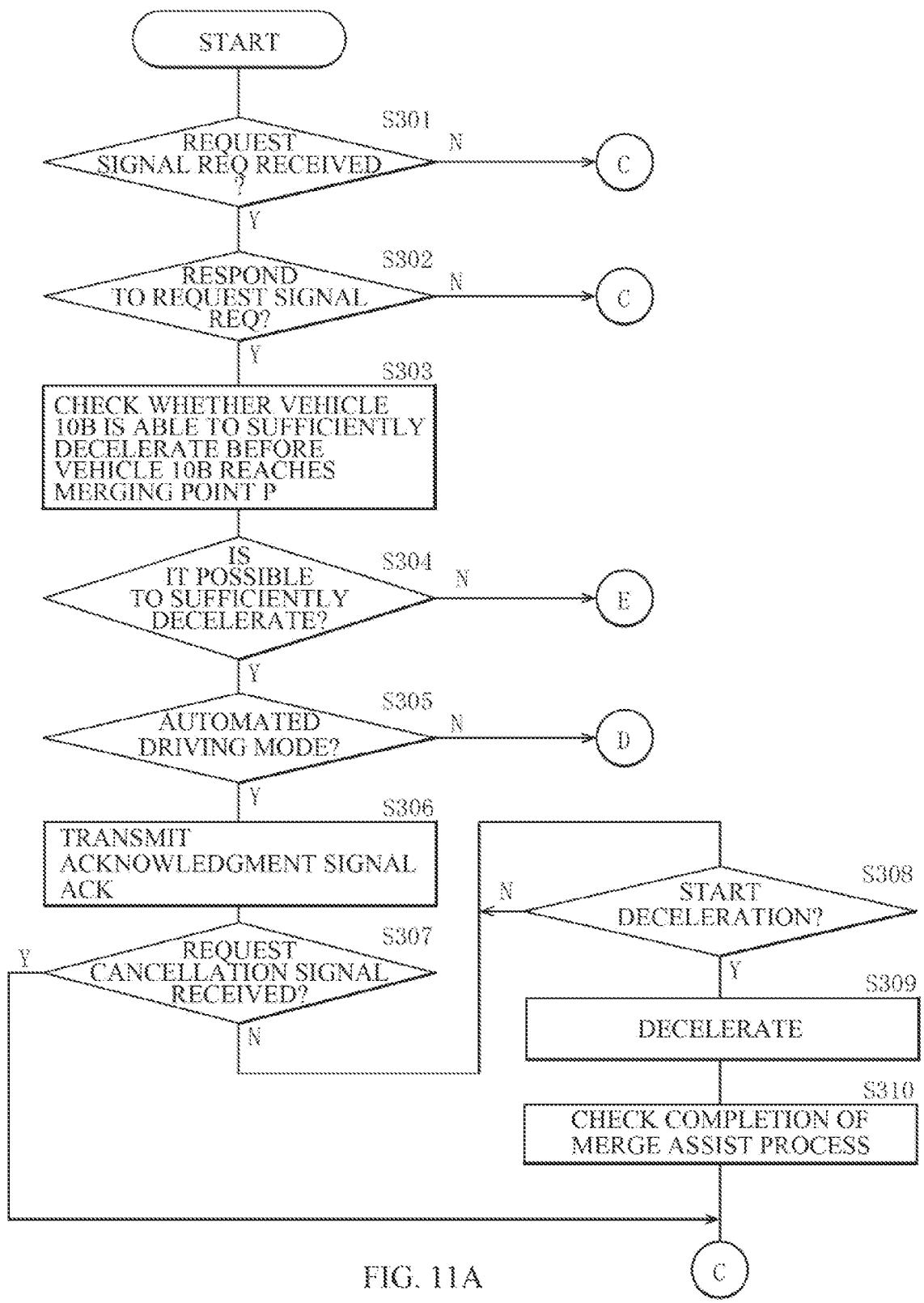
FIG. 11A is a flowchart illustrating an example of the merge assist process performed in a vehicle that is traveling on a traveling path.
Figure 11B:
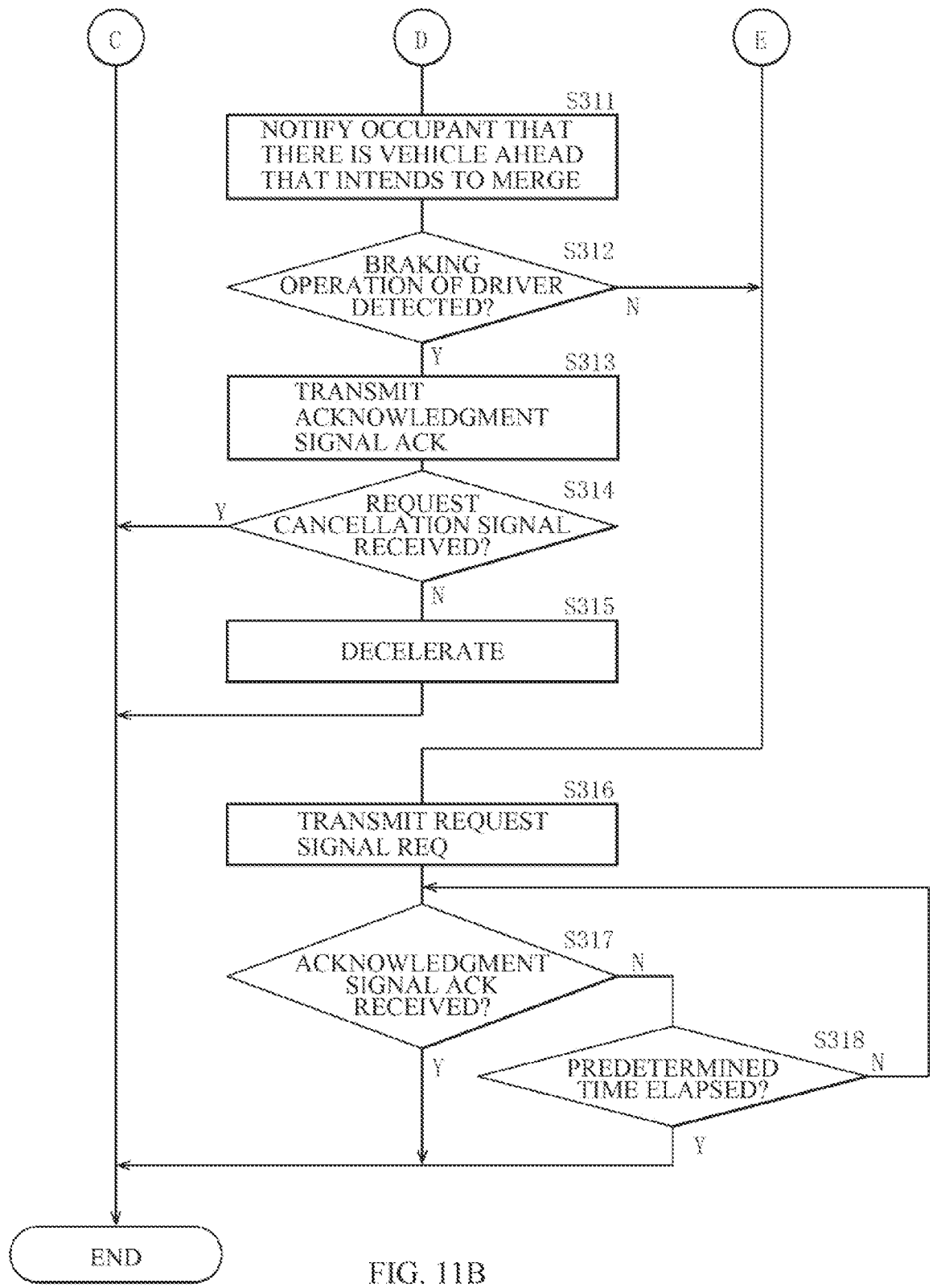
FIG. 11B is a flowchart illustrating the example of the merge assist process performed in the vehicle that is traveling on the traveling path.

FIGS. 11A and 11B illustrate an example operation of the vehicle 10B. The vehicle 10B may repeatedly execute the processes illustrated in FIGS. 11A and 11B.

First, the communication processing unit 21 of the vehicle 10B may check whether the communicator 15 has received the request signal REQ (step S301). The request signal REQ may be transmitted from the vehicle 10A in Case C1 (FIGS. 3 to 5), from the vehicles 10A and 10B1 in Case C2 (FIGS. 6 and 7), and from the vehicles 10A, 10B1, and 10B2 in Case C3 (FIGS. 8, 9A, and 9B). If the communicator 15 has not received the request signal REQ ("N" in step S301), the flow may end.

In step S301, if the communicator 15 has received the request signal REQ ("Y" in step S301), the flow may proceed to step S302, and the determination unit 22 may determine whether to respond to the request signal REQ (step S302). For example, the determination unit 22 may determine whether to respond to the request signal REQ by determining, based on the data supplied from the navigator 11, whether the position of the vehicle 10B is before the merging point P and whether the lane on which the vehicle 10B is traveling is the lane to which the vehicle 10A is to merge. If the vehicle 10B is not to respond to the request signal REQ ("N" in step S302), the flow may end.

In step S302, if the vehicle 10B is to respond to the request signal REQ, the flow may proceed to step S303, and the determination unit 22 may check whether the vehicle 10B is able to sufficiently decelerate before the vehicle 10B reaches the merging point P (step S303). For example, the determination unit 22 may calculate a distance between the position of the vehicle 10B and the merging point P, based on the data regarding the position of the merging point P included in the request signal REQ. The determination unit 22 may determine whether the vehicle 10B is able to decelerate to a speed less than or equal to the predetermined speed before the vehicle 10B reaches the merging point P, based on the speed of the vehicle 10B and the distance to the merging point P. If the vehicle 10B is unable to sufficiently decelerate ("N" in step S304), the flow may proceed to step S316.

In step S304, if the vehicle 10B is able to sufficiently decelerate ("Y" in step S304), the flow may proceed to step S305, and the driving mode setting unit 27 may check whether the vehicle 10B is driving in the automated driving mode (step S305). If the vehicle 10B is driving in the manual driving mode ("N" in step S305), the flow may proceed to step S311.

In step S305, if the vehicle 10B is traveling in the automated driving mode ("Y" in step S305), the flow may proceed to step S306, and the vehicle 10B may transmit the acknowledgment signal ACK (step S306). For example, the communication processing unit 21 may generate the acknowledgment signal ACK including the data regarding the position of the vehicle 10B supplied from the navigator 11. Additionally, the acknowledgment signal ACK may further include the data regarding the type and the color of the vehicle 10B. Thereafter, the communicator 15 may transmit the acknowledgment signal ACK to the vehicle 10 that has transmitted the request signal REQ, based on identifier data, of the vehicle 10 that has transmitted the request signal REQ, included in the request signal REQ. If the vehicle 10 that has transmitted the request signal REQ is not the vehicle 10A that intends to merge, the communicator 15 may also transmit the acknowledgment signal ACK to the vehicle 10A using the identifier data of the vehicle 10A included in the request signal REQ.

Thereafter, the communication processing unit 21 may check whether the communicator 15 has received the request cancellation signal (step S307). If the communicator 15 has received the request cancellation signal ("Y" in step S307), the flow may end. In this case, because the merge assist process is cancelled, it is possible for the vehicle 10B to continue traveling without decelerating.

If the communicator 15 has not received the request cancellation signal ("N" in step S307), the processor 20 may check whether to start decelerating (step S308). For example, the processor 20 may check whether the vehicle 10B is to start decelerating by checking whether the vehicle 10B has approached the merging point P, based on the data supplied from the navigator 11. If the vehicle 10B is yet to start decelerating ("N" in step S308), the processor 20 may repeat the process of step S308 until it is determined that the vehicle 10B is to start decelerating.

If the vehicle 10B is to start decelerating ("Y" in step S308), the vehicle 10B may decelerate (step S309). For example, the travel control unit 28 may control traveling of the vehicle 10B to cause the vehicle 10B to sufficiently decelerate before the vehicle 10B reaches the merging point P, based on the processing result of the automated driving control.

Thereafter, the vehicle 10A may merge into the traveling path 100 in front of the vehicle 10B that has decelerated.

Thereafter, the merge completion checking unit 24 may check the completion of the merge assist process (step S310). For example, the merge completion checking unit 24 may check the completion of the merge assist process by checking that the vehicle 10A has merged in front of the vehicle 10B, based on the captured images supplied from the imaging unit 14. This may be the end of this flow.

In step S305, if the vehicle 10B is traveling in the manual driving mode ("N" in step S305), the flow may proceed to step S311, and the notification processing unit 25 may notify the occupant of the vehicle 10B that there is the vehicle 10A ahead that intends to merge into the traveling path 100 using the user interface 16 (step S311). To cooperate with the vehicle 10A in merging in response to the notification, the driver of the vehicle 10B may perform a braking operation.

Thereafter, the travel control unit 28 may check whether the braking operation of the driver has been detected (step S312). If the braking operation of the driver has not been detected ("N" in step S312), the flow may proceed to step S316.

In step S312, if the travel control unit 28 has detected the braking operation of the driver ("Y" in step S312), the flow may proceed to step S313, and the vehicle 10B may transmit the acknowledgment signal ACK (step S313). For example, the communication processing unit 21 may generate the acknowledgment signal ACK including the data regarding the position of the vehicle 10B supplied from the navigator 11. Additionally, the acknowledgment signal ACK may further include the data regarding the type and the color of the vehicle 10B. Thereafter, the communicator 15 may transmit the acknowledgment signal ACK to the vehicle 10 that has transmitted the request signal REQ, based on the identifier data, of the vehicle 10 that has transmitted the request signal REQ, included in the request signal REQ. If the vehicle 10 that has transmitted the request signal REQ is not the vehicle 10A, the communicator 15 may also transmit the acknowledgment signal ACK to the vehicle 10A using the identifier data of the vehicle 10A included in the request signal REQ.

Thereafter, the communication processing unit 21 may check whether the communicator 15 has received the request cancellation signal (step S314). If the communicator 15 has received the request cancellation signal ("Y" in step S314), the flow may end.

If the communicator 15 has not received the request cancellation signal ("N" in step S314), the vehicle 10B may decelerate (step S315). For example, the travel control unit 28 may control the vehicle 10B to decelerate based on the braking operation of the driver. This may be the end of this flow.

In step S304, if the vehicle 10B is unable to sufficiently decelerate ("N" in step S304), and in step S312, if the travel control unit 28 has not detected the braking operation of the driver ("N" in step S312), the flow may proceed to step S316, and the vehicle 10B may transmit the request signal REQ (step S316). For example, the communication processing unit 21 of the vehicle 10B may generate the request signal REQ including the data regarding the position of the merging point P, the identifier data of the vehicle 10A, and identifier data of the vehicle 10B serving as the own vehicle, based on the request signal REQ received in step S301. Thereafter, the communicator 15 may broadcast the request signal REQ. In this example, the vehicle 10B may be unable to cooperate with the vehicle 10A in merging because the vehicle 10B is unable to sufficiently decelerate before the vehicle 10B reaches the merging point P or because the braking operation to decelerate is not performed. For this reason, the vehicle 10B may transmit the request signal REQ on behalf of the vehicle 10A.

Thereafter, the processor 20 may check whether the acknowledgment signal ACK has been received (step S317). If the acknowledgment signal ACK has not been received ("N" in step S317), the processor 20 may check whether the predetermined time, such as ten seconds, has elapsed (step S318). If the predetermined time has not elapsed ("N" in step S318), the processor 20 may repeat the processes of steps S317 and S318 until the predetermined time elapses.

In step S317, if the acknowledgment signal ACK has been received ("Y" in step S317), and in step S318, if the predetermined time has elapsed ("Y" in step S318), the flow may end.

As described above, the merge assist apparatus 9 to be applied to the own vehicle includes the receiver (the communicator 15), the processor 20, and the transmitter (the communicator 15). The receiver (the communicator 15) is configured to receive the first request signal (the request signal REQ) including the merging point data regarding the position of the merging point P at which the first vehicle (the vehicle 10A) plans to merge. The processor 20 is configured to determine whether the own vehicle (the vehicle 10B) is able to decelerate to a speed less than or equal to the predetermined speed before the own vehicle reaches the merging point P, based on the merging point data included in the first request signal (the request signal REQ). The transmitter (the communicator 15) is configured to transmit, to the second vehicle (another vehicle 10B) traveling behind the own vehicle (the vehicle 10B), the second request signal (another request signal REQ) including the merging point data included in the first request signal (the request signal REQ) when the processor 20 determines that the own vehicle (the vehicle 10B) is unable to decelerate to the speed less than or equal to the predetermined speed. For example, in Case C2 (FIGS. 6 and 7), the vehicle 10B1 receives the request signal REQ1 including the merging point data regarding the position of the merging point P at which the vehicle 10A plans to merge. If the vehicle 10B1 is unable to sufficiently decelerate before the vehicle 10B1 reaches the merging point P, the vehicle 10B1 transmits the request signal REQ2 to the vehicle 10B2 traveling behind the vehicle 10B1. For example, in Case C3 (FIGS. 8, 9A, and 9B), the vehicle 10B2 may receive the request signal REQ2 including the merging point data regarding the position of the merging point P at which the vehicle 10A plans to merge. If the vehicle 10B2 is unable to sufficiently decelerate before the vehicle 10B2 reaches the merging point P, the vehicle 10B2 may transmit the request signal REQ3 to the vehicle 10B3 traveling behind the vehicle 10B2. Thus, the merge assist apparatus 9 makes it possible to transmit the request signal REQ to the vehicle 10B located so far that the vehicle 10A is unable to directly transmit the request signal REQ1, as described above. This makes it possible to reduce limitation caused by the communication range of the vehicle-to-vehicle communication and transmit the request signal REQ to a greater number of vehicles 10B. Additionally, because there is high possibility that the vehicle 10B located far away from the merging point P is able to sufficiently decelerate before the vehicle 10B reaches the merging point P, there is high possibility that the vehicle 10B located far away is able to serve as the cooperating vehicle that cooperates with the vehicle 10A in merging. This makes it possible for the merge assist apparatus 9 to appropriately assist in merging of the vehicle 10A.

In the merge assist apparatus 9, the processor 20 may be configured to detect whether the braking operation is performed by the driver who drives the vehicle. The transmitter (the communicator 15) may be configured to transmit the second request signal to the second vehicle when: the processor 20 determines that the own vehicle (the vehicle 10B) is able to decelerate to the speed less than or equal to the predetermined speed before the own vehicle (the vehicle 10B) reaches the merging point P; and the processor 20 does not detect the braking operation by the driver. Thus, when the vehicle 10B is traveling in the manual driving mode, even when it is determined that the vehicle 10B is able to sufficiently decelerate before the vehicle 10B reaches the merging point P, it is possible for the merge assist apparatus 9 to transmit the request signal REQ to another vehicle 10B when the driver does not actually perform the braking operation. This makes it possible for the merge assist apparatus 9 to appropriately assist in merging of the vehicle 10A.

In the merge assist apparatus 9, the transmitter (the communicator 15) may be configured to transmit the acknowledgment signal ACK to the first vehicle (the vehicle 10A) when: the processor 20 determines that the own vehicle (the vehicle 10B) is able to decelerate to the speed less than or equal to the predetermined speed before the own vehicle (the vehicle 10B) reaches the merging point P; and the processor 20 detects the braking operation by the driver. Thus, when the vehicle 10B is traveling in the manual driving mode, it is possible for the merge assist apparatus 9 to transmit the acknowledgment signal ACK to the vehicle 10A when: it is determined that the vehicle 10B is able to sufficiently decelerate before the vehicle 10B reaches the merging point P; and the driver actually performs the braking operation. This makes it possible for the vehicle 10A that has received the acknowledgment signal ACK to grasp that the vehicle 10B is the cooperating vehicle that cooperates with the vehicle 10A in merging. This makes it possible for the merge assist apparatus 9 to appropriately assist in merging of the vehicle 10A.

Example Effects

In the example embodiment, the merge assist apparatus to be applied to the relevant vehicle includes the receiver, the processor, and the transmitter. The receiver is configured to receive the first request signal including the merging point data regarding the position of the merging point at which the first vehicle plans to merge. The processor is configured to determine whether the relevant vehicle is able to decelerate to a speed less than or equal to the predetermined speed before the relevant vehicle reaches the merging point, based on the merging point data included in the first request signal. The transmitter is configured to transmit, to the second vehicle traveling behind the relevant vehicle, the second request signal including the merging point data included in the first request signal when the processor determines that the relevant vehicle is unable to decelerate to the speed less than or equal to the predetermined speed. This helps the merge assist apparatus to appropriately assist in merging of the vehicle.

In some embodiments, the processor may be configured to detect whether the braking operation is performed by the driver who drives the relevant vehicle. The transmitter may be configured to transmit the second request signal to the second vehicle when: the processor determines that the relevant vehicle is able to decelerate to the speed less than or equal to the predetermined speed before the relevant vehicle reaches the merging point; and the processor does not detect the braking operation by the driver. This helps the merge assist apparatus to appropriately assist in merging of the vehicle.

In some embodiments, the transmitter may be configured to transmit the acknowledgment signal to the first vehicle when: the processor determines that the relevant vehicle is able to decelerate to the speed less than or equal to the predetermined speed before the relevant vehicle reaches the merging point; and the processor detects the braking operation by the driver. This helps the merge assist apparatus to appropriately assist in merging of the vehicle.

Modification 1

In the above example embodiment, although the vehicle 10B may be configured to transmit the acknowledgment signal ACK, this example is a non-limiting example. In some embodiments, the vehicle 10B may skip transmitting the acknowledgment signal ACK. Cases C2 and C3 will hereafter be described as examples.

Figure 12:
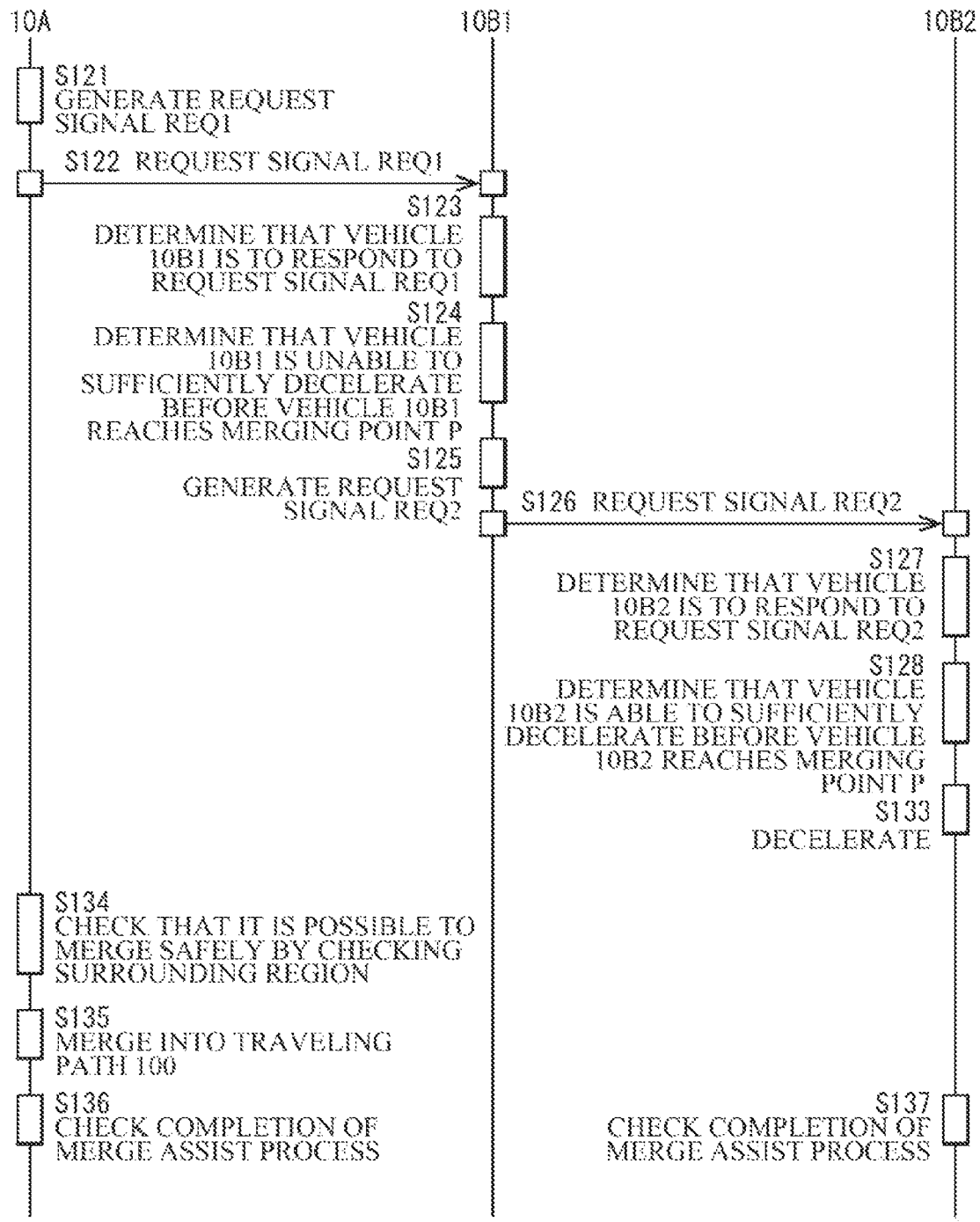
FIG. 12 is a sequence diagram illustrating an example of a merge assist process performed by a merge assist system according to one modification.

FIG. 12 illustrates an example of a merge assist process performed in Case C2 according to Modification 1. The processes in steps S121 to S128 may be similar to those in the case of the above example embodiment (FIG. 7).

In step S128, when the determination unit 22 of the vehicle 10B2 determines that the vehicle 10B2 is able to sufficiently decelerate before the vehicle 10B2 reaches the merging point P, the travel control unit 28 of the vehicle 10B2 may control traveling of the vehicle 10B2 to sufficiently decelerate the vehicle 10B2 before the vehicle 10B2 reaches the merging point P (step S133).

The external environment detecting unit 26 of the vehicle 10A may check that it is possible for the vehicle 10A to merge safely by checking a surrounding region of the vehicle 10A, based on the captured images supplied from the imaging unit 14 (step S134).

Thereafter, the vehicle 10A may merge into the traveling path 100 (step S135).

Thereafter, the merge completion checking unit 24 of the vehicle 10A may check the completion of the merge assist process (step S136). For example, the merge completion checking unit 24 of the vehicle 10A may check the completion of the merge assist process by checking that the vehicle 10A has merged, based on, for example, the data supplied from the navigator 11 and the captured images supplied from the imaging unit 14.

The merge completion checking unit 24 of the vehicle 10B2 may check the completion of the merge assist process (step S137). For example, the merge completion checking unit 24 of the vehicle 10B2 may check the completion of the merge assist process by checking that the vehicle 10A has merged in front of the vehicle 10B2, based on the captured images supplied from the imaging unit 14.

Figure 13A:
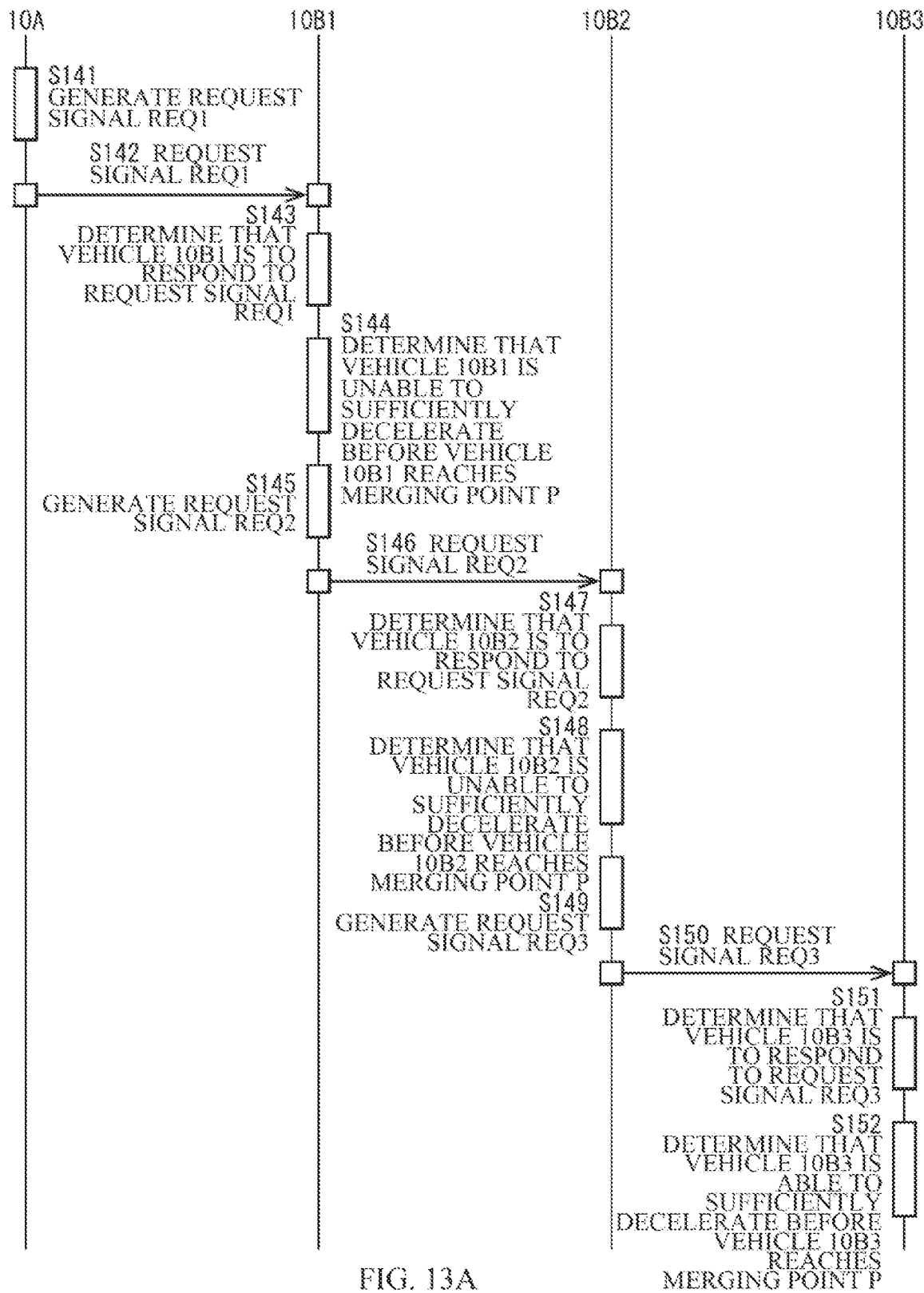
FIG. 13A is a sequence diagram illustrating another example of a merge assist process performed by a merge assist system according to one modification.
Figure 13B:
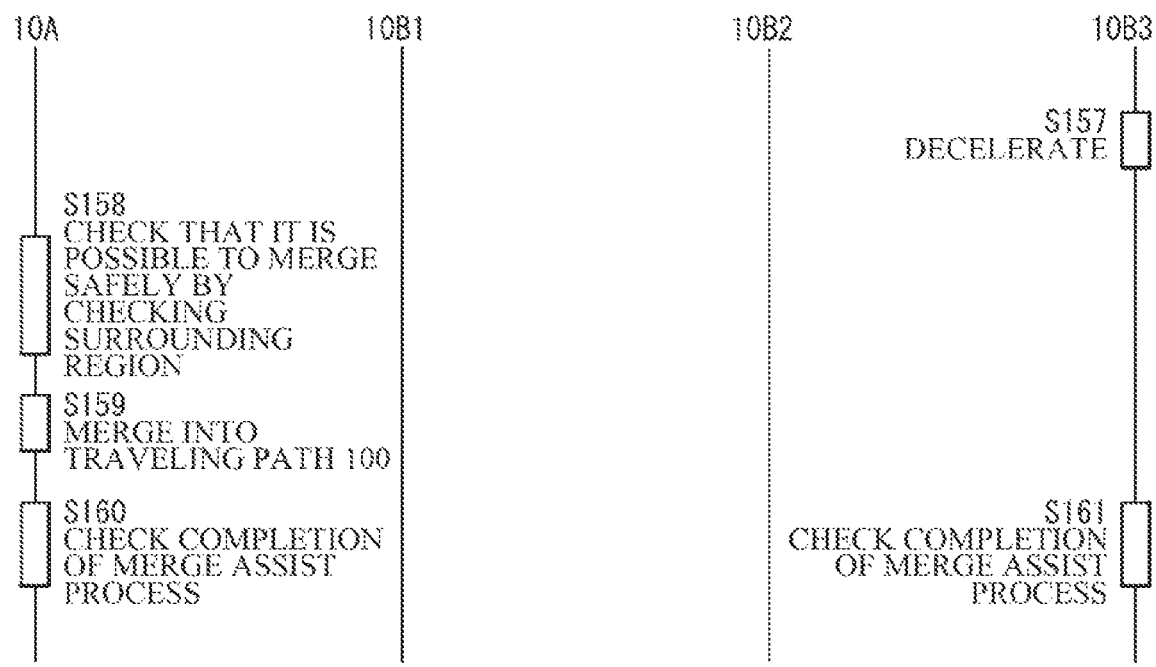
FIG. 13B is another sequence diagram illustrating the other example of the merge assist process performed by the merge assist system according to one modification.

FIGS. 13A and 13B illustrate an example of the merge assist process performed in Case C3 according to Modification 1. The processes in steps S141 to S152 may be similar to those in the case of the above example embodiment (FIGS. 9A and 9B).

In step S152, if the determination unit 22 of the vehicle 10B3 determines that the vehicle 10B3 is able to sufficiently decelerate before the vehicle 10B3 reaches the merging point P, the travel control unit 28 of the vehicle 10B3 may control traveling of the vehicle 10B3 to sufficiently decelerate the vehicle 10B3 before the vehicle 10B3 reaches the merging point P (step S157).

The external environment detecting unit 26 of the vehicle 10A may check that it is possible for the vehicle 10A to merge safely by checking a surrounding region of the vehicle 10A, based on the captured images supplied from the imaging unit 14 (step S158).

Thereafter, the vehicle 10A may merge into the traveling path 100 (step S159).

Thereafter, the merge completion checking unit 24 of the vehicle 10A may check the completion of the merge assist process (step S160). For example, the merge completion checking unit 24 of the vehicle 10A may check the completion of the merge assist process by checking that the vehicle 10A has merged, based on, for example, the data supplied from the navigator 11 and the captured images supplied from the imaging unit 14.

Additionally, the merge completion checking unit 24 of the vehicle 10B3 may check the completion of the merge assist process (step S161). For example, the merge completion checking unit 24 of the vehicle 10B3 may check the completion of the merge assist process by checking that the vehicle 10A has merged in front of the vehicle 10B3, based on the captured images supplied from the imaging unit 14.

Modification 2

In the above example embodiment, although the disclosure is applied to the vehicle including the automated driving mode and the manual driving mode, this example is a non-limiting example. In some embodiments, the disclosure may be applied to a vehicle including the manual driving mode.

Other Modifications

Note that any two or more of these modifications may be combined with each other.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, the merge assist process illustrated in FIGS. 4, 7, 9A, and 9B may be an example, and some of the processes may be omitted, or other processes may be added.

The example effects described herein are mere examples, and example effects of the disclosure are therefore not limited to those described herein. Accordingly, the disclosure may achieve any other example effect.

Furthermore, the disclosure may encompass at least the following embodiments.

(1) A merge assist apparatus to be applied to a relevant vehicle, the merge assist apparatus including:
a receiver configured to receive a first request signal including merging point data regarding a position of a merging point at which a first vehicle plans to merge;
a processor configured to determine whether the relevant vehicle is able to decelerate to a speed less than or equal to a predetermined speed before the relevant vehicle reaches the merging point, based on the merging point data included in the first request signal; and
a transmitter configured to transmit, to a second vehicle traveling behind the relevant vehicle, a second request signal including the merging point data included in the first request signal when the processor determines that the relevant vehicle is unable to decelerate to the speed less than or equal to the predetermined speed.

(2) The merge assist apparatus according to (1), in which the first request signal is configured to be transmitted from the first vehicle.

(3) The merge assist apparatus according to (1), in which the first request signal is configured to be transmitted from a third vehicle traveling in front of the relevant vehicle.

(4) The merge assist apparatus according to any one of (1) to (3), in which
the processor is configured to detect whether a braking operation is performed by a driver who drives the relevant vehicle, and
the transmitter is configured to transmit the second request signal to the second vehicle when: the processor determines that the relevant vehicle is able to decelerate to the speed less than or equal to the predetermined speed before the relevant vehicle reaches the merging point; and the processor does not detect the braking operation by the driver.

(5) The merge assist apparatus according to (4), in which the transmitter is configured to transmit an acknowledgment signal to the first vehicle when: the processor determines that the relevant vehicle is able to decelerate to the speed less than or equal to the predetermined speed before the relevant vehicle reaches the merging point; and the processor detects the braking operation by the driver.

The merge assist apparatus according to at least one embodiment of the disclosure makes it possible to more appropriately assist in merging of a vehicle.

The processor 20 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 20 illustrated in FIG. 2.

The invention claimed is:

1. A merge assist apparatus to be applied to a vehicle, the vehicle traveling on a traveling path, the merge assist apparatus comprising:

a receiver configured to receive a first request signal comprising merging point data regarding a position of a merging point at which a first vehicle plans to merge into the traveling path;

a processor configured to:
- upon receiving the first request signal, determine whether the vehicle is able to decelerate to a predetermined speed or less before the vehicle reaches the merging point, wherein decelerating the vehicle to the predetermined speed or less allows the first vehicle to merge into the traveling path;
- upon determining that the vehicle is able to decelerate to the predetermined speed or less, cause at least one of a power source and a braking device of the vehicle to decelerate to the predetermined speed or less; and
- upon determining that the vehicle is not able to decelerate to the predetermined speed or less, cause a transmitter to transmit, to a second vehicle traveling behind the vehicle, a second request signal comprising the merging point data included in the first request signal.

2. The merge assist apparatus according to claim 1, wherein the first request signal is a signal transmitted from the first vehicle.

3. The merge assist apparatus according to claim 1, wherein the first request signal is a signal transmitted from a third vehicle traveling in front of the vehicle.

4. The merge assist apparatus according to claim 1, wherein the processor is further configured to cause the transmitter to transmit an acknowledgment signal to the first vehicle upon determining that the vehicle is able to decelerate to the predetermined speed or less before the vehicle reaches the merging point.

5. A merge assist apparatus to be applied to a vehicle, the vehicle traveling on a traveling path, the merge assist apparatus comprising one or more processors configured to:
- receive a first request signal comprising merging point data regarding a position of a merging point at which a first vehicle plans to merge into the traveling path;
- upon receiving the first request signal, determine whether the vehicle is able to decelerate to a predetermined speed or less before the vehicle reaches the merging point, wherein decelerating the vehicle to the predetermined speed or less allows the first vehicle to merge into the traveling path;
- upon determining that the vehicle is able to decelerate to the predetermined speed or less, cause at least one of a power source and a braking device of the vehicle to decelerate to the predetermined speed or less; and
- upon determining that the vehicle is not able to decelerate to the predetermined speed or less, transmit, to a second vehicle traveling behind the vehicle, a second request signal comprising the merging point data included in the first request signal.

\* \* \* \* \*